(12) United States Patent
Homma et al.

(10) Patent No.: US 11,118,103 B2
(45) Date of Patent: Sep. 14, 2021

(54) COMPOSITION COMPRISING ULTRAFINE CELLULOSE FIBERS

(71) Applicant: Oji Holdings Corporation, Tokyo (JP)

(72) Inventors: Ikue Homma, Tokyo (JP); Takayuki Shimaoka, Tokyo (JP); Moe Mizukami, Tokyo (JP); Takuri Ozaki, Tokyo (JP); Yuichi Noguchi, Tokyo (JP); Mitsuru Tsunoda, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 0 days.

(21) Appl. No.: 15/519,229

(22) PCT Filed: Oct. 13, 2015

(86) PCT No.: PCT/JP2015/078935
§ 371 (c)(1),
(2) Date: Apr. 14, 2017

(87) PCT Pub. No.: WO2016/060120
PCT Pub. Date: Apr. 21, 2016

(65) Prior Publication Data
US 2017/0226407 A1    Aug. 10, 2017

(30) Foreign Application Priority Data

Oct. 15, 2014  (JP) .............................. JP2014-211020
Jul. 23, 2015  (JP) .............................. JP2015-145662

(51) Int. Cl.
*D01F 2/24*  (2006.01)
*D01F 2/00*  (2006.01)
(Continued)

(52) U.S. Cl.
CPC ............... *C09K 8/60* (2013.01); *C04B 28/02* (2013.01); *C04B 40/0039* (2013.01); *C08K 3/24* (2013.01);
(Continued)

(58) Field of Classification Search
CPC ...................................................... C09K 8/10
(Continued)

(56) References Cited

U.S. PATENT DOCUMENTS 3,716,526 A * 2/1973 Schweiger .......... C08B 37/0057
                                                        536/114
4,629,575 A * 12/1986 Weibel ................... C09K 8/206
                                                        106/162.9
(Continued)

FOREIGN PATENT DOCUMENTS

CN         1227889 A      9/1999
CN       101098632 A      1/2008
(Continued)

OTHER PUBLICATIONS

Natural Cellulose fibers and Membranes: Biosynthesis, Rånby, Encyclopedia of Materials: Science and Technology, pp. 5938-5944, 2001 (Year: 2001).*

(Continued)

*Primary Examiner* — Aiqun Li
(74) *Attorney, Agent, or Firm* — Birch, Stewart, Kolasch & Birch, LLP

(57) ABSTRACT

An object of the present invention is to provide a salt water thickener that uniformly (favorably) disperses ultrafine cellulose fibers even in a liquid containing a salt (electrolyte). The salt water thickener comprises ultrafine cellulose fibers and a water-soluble polymer and can thereby uniformly disperse the ultrafine cellulose fibers even in a liquid containing a salt. The salt water thickener of the present
(Continued)

invention is uniformly dispersed even in a liquid containing a salt and therefore exerts a high viscosity. The salt water thickener of the present invention can also be used as an additive for a fluid. The salt water thickener of the present invention can be used for purposes, for example, subterranean formation processing.

1 Claim, 2 Drawing Sheets

(51) Int. Cl.
  *E21B 43/28*    (2006.01)
  *C09K 8/60*    (2006.01)
  *C09K 3/00*    (2006.01)
  *D21H 11/20*    (2006.01)
  *C08L 5/00*    (2006.01)
  *C09K 8/90*    (2006.01)
  *C09K 8/467*    (2006.01)
  *C08L 1/02*    (2006.01)
  *C09K 8/575*    (2006.01)
  *C09K 8/72*    (2006.01)
  *C09K 8/516*    (2006.01)
  *C09K 8/40*    (2006.01)
  *C09K 8/68*    (2006.01)
  *C04B 40/00*    (2006.01)
  *C09K 8/035*    (2006.01)
  *C04B 28/02*    (2006.01)
  *C09K 8/508*    (2006.01)
  *C09K 8/514*    (2006.01)
  *C09K 8/88*    (2006.01)
  *C09K 8/10*    (2006.01)
  *C08K 3/24*    (2006.01)

(52) U.S. Cl.
  CPC .................. *C08L 1/02* (2013.01); *C08L 5/00* (2013.01); *C09K 3/00* (2013.01); *C09K 8/035* (2013.01); *C09K 8/10* (2013.01); *C09K 8/40* (2013.01); *C09K 8/467* (2013.01); *C09K 8/508* (2013.01); *C09K 8/514* (2013.01); *C09K 8/516* (2013.01); *C09K 8/5751* (2013.01); *C09K 8/5758* (2013.01); *C09K 8/68* (2013.01); *C09K 8/725* (2013.01); *C09K 8/88* (2013.01); *C09K 8/90* (2013.01); *D01F 2/24* (2013.01); *D21H 11/20* (2013.01); *E21B 43/283* (2013.01); *C09K 2208/08* (2013.01); *D01F 2/00* (2013.01); *Y02W 30/91* (2015.05)

(58) Field of Classification Search
  USPC ........................................................ 507/112
  See application file for complete search history.

(56) References Cited

U.S. PATENT DOCUMENTS

| | | | |
|---|---|---|---|
| 5,703,225 A * | 12/1997 | Shet | A61L 15/28 34/95 |
| 6,348,436 B1 | 2/2002 | Langlois et al. | |
| 2003/0176293 A1 * | 9/2003 | Schilling | C09K 8/08 507/104 |
| 2005/0272836 A1 | 12/2005 | Yaginuma et al. | |
| 2006/0079408 A1 | 4/2006 | Verret | |
| 2009/0291875 A1 * | 11/2009 | Lant | C11D 3/38636 510/320 |
| 2013/0035263 A1 | 2/2013 | Laukkanen et al. | |
| 2013/0196883 A1 | 8/2013 | Rincon-Torres et al. | |
| 2013/0274149 A1 * | 10/2013 | Lafitte | C09K 8/905 507/112 |

FOREIGN PATENT DOCUMENTS

| | | |
|---|---|---|
| CN | 100451035 C | 1/2009 |
| CN | 101208358 B | 8/2011 |
| JP | 11-323018 A | 11/1999 |
| JP | 2000-503703 A | 3/2000 |
| JP | 2000-503704 A | 3/2000 |
| JP | 2005-507649 A | 3/2005 |
| JP | 2006-8857 A | 1/2006 |
| JP | 2006-516995 A | 7/2006 |
| JP | 2008-50376 A | 3/2008 |
| JP | 2008-050377 A | 3/2008 |
| JP | 2008-92914 A | 4/2008 |
| JP | 2008-106178 A | 5/2008 |
| JP | 2010-37348 A | 2/2010 |
| JP | 2011-017393 A | 1/2011 |
| JP | 2012-126788 A | 7/2012 |
| JP | 2013-521359 A | 6/2013 |
| JP | 2013-521364 A | 6/2013 |
| JP | 5296445 B2 | 9/2013 |
| JP | 2013181084 A | 9/2013 |
| JP | WO2014/024876 A1 | 2/2014 |
| JP | 2014-114338 A | 6/2014 |
| JP | WO2014/088072 A1 | 6/2014 |
| JP | 2014-141675 A | 8/2014 |
| WO | WO 03/011051 A1 | 2/2003 |
| WO | WO 2004/069179 A2 | 8/2004 |
| WO | WO 2004/069179 A3 | 8/2004 |
| WO | WO 2007/001229 A1 | 1/2007 |
| WO | 2011/107440 A1 | 9/2011 |
| WO | 2011/107463 A1 | 9/2011 |
| WO | WO 2013/154926 A1 | 10/2013 |
| WO | WO 2014/148917 A | 9/2014 |
| WO | WO 2015/107995 A1 | 7/2015 |

OTHER PUBLICATIONS

Araki, "Electrostatic or Steric?—Preparations and Characterizations of Well-Dispersed Systems Containing Rod-Like Nanowhiskers of Crystalline Polysaccharides," Soft Matter, vol. 9, 2013, pp. 4125-4141.

International Preliminary Report on Patentability and Written Opinion of the International Searching Authority (Forms PCT/IB/338, PCT/IB/373, PCT/IB/326 and PCT/ISA/237) for International Application No. PCT/JP2015/078935, dated Apr. 27, 2017, with an English translation of the Written Opinion.

International Search Report and Written Opinion of the International Searching Authority (Forms PCT/ISA/220, PCT/ISA/210 and PCT/ISA/237) for International Application No. PCT/JP2015/078935, dated Jan. 12, 2016.

Saito et al., "Homogeneous Suspensions of Individualized Microfibrils from TEMPO-Catalyzed Oxidation of Native Cellulose," BioMacromolecules, vol. 7, No. 6, Jun. 2006 (published on web May 3, 2006), pp. 1687-1691.

Japanese Office Action, dated Sep. 11, 2018, issued in corresponding Application No. 2016-554083.

Chinese Office Action, dated Jun. 22, 2018, for corresponding Chinese Application No. 201580056090.9 with an English translation.

Extended European Search Report, dated Aug. 28, 2018, for European Application No. 15850969.5.

Japanese Notice of Reasons for Refusal dated Jun. 25, 2019, for corresponding Japanese Patent Application No. 2016-554083, with English translation.

Communication Pursuant to Article 94(3) EPC dated Mar. 9, 2020, in European Patent Application No. 15 850 969.5.

Japanese Notice of Reasons for Refusal dated Jan. 21, 2020 for corresponding Japanese Patent Application No. 2016-554083, with English translation.

Japanese Office Action for JP Application No. 2020-048602 dated Jan. 26, 2021 (with English Translation).

Office Action dated Oct. 21, 2020 for corresponding EP Application No. 15 850 969.5.

(56) References Cited

OTHER PUBLICATIONS

Wagberg et al., "The Build-Up of Polyelectrolyte Multilayers of Microfibrillated Cellulose and Cationic Polyelectrolytes", Langmuir, vol. 24, No. 3, Jan. 11, 2005 pp. 784-795.
European Patent Office Communication dated Jun. 8, 2021 in corresponding EP Application No. 15850969.5.

* cited by examiner

[Figure 1]
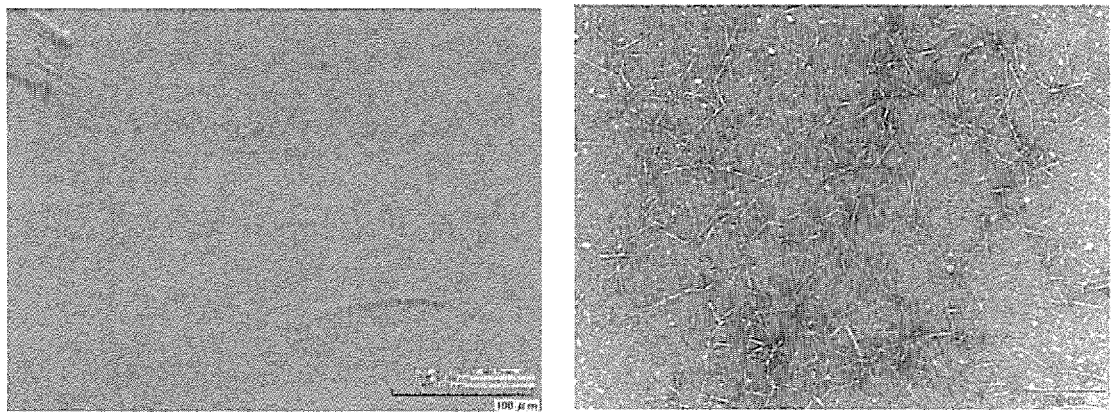
[Figure 2]
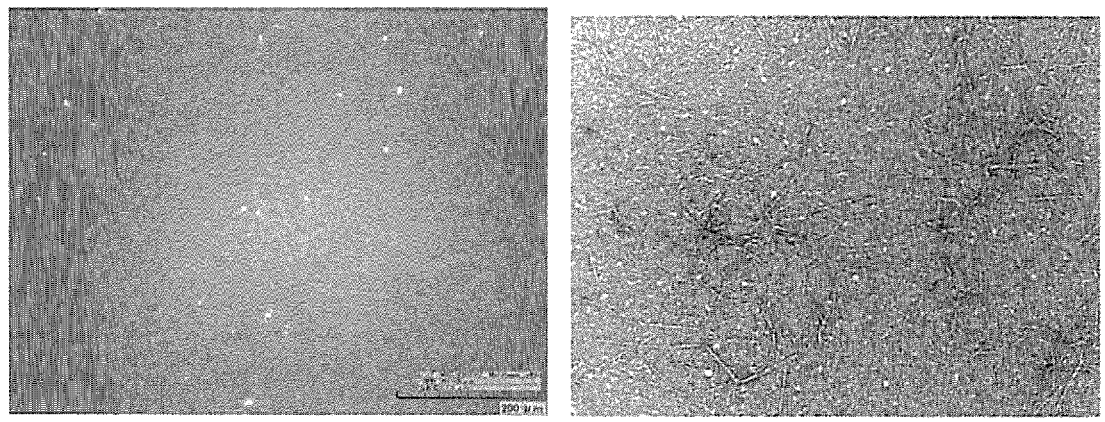

[Figure 3]
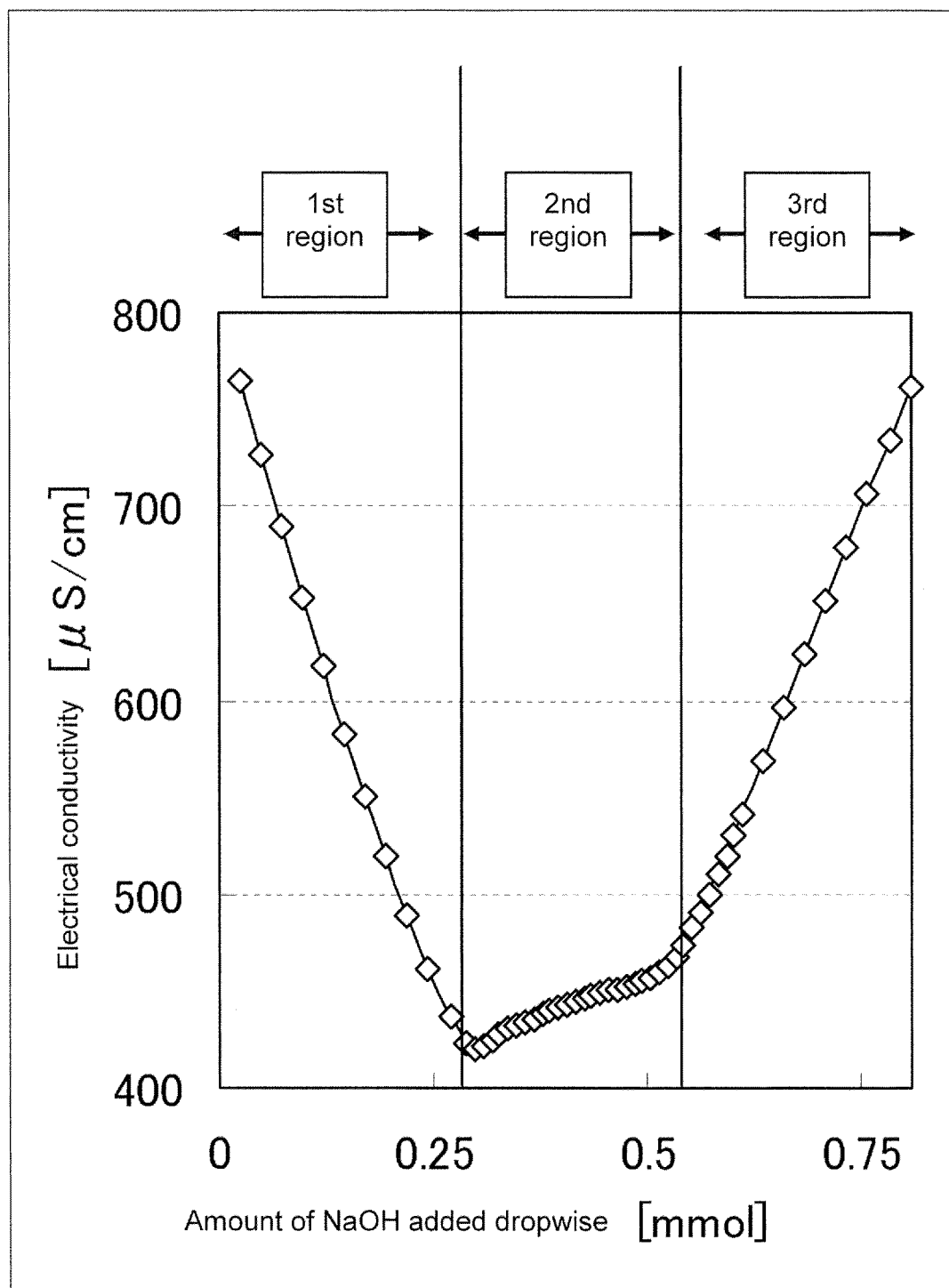

COMPOSITION COMPRISING ULTRAFINE CELLULOSE FIBERS

TECHNICAL FIELD

The present invention relates to a composition comprising ultrafine cellulose fibers. More specifically, the present invention relates to a salt water thickener comprising ultrafine cellulose fibers that become stably dispersible even in a liquid containing a salt by mixing a water-soluble polymer with the ultrafine cellulose fibers. The salt water thickener can be used in subterranean formation processing, etc.

BACKGROUND ART

A salt contained in a liquid such as water for dispersing ultrafine cellulose fibers disadvantageously reduces the dispersibility of the ultrafine cellulose fibers. Such ultrafine cellulose fibers having the reduced dispersibility fail to sufficiently exert their effects (e.g., effects such as a thickening property). Thus, there is a demand for the development of a composition that can uniformly disperse ultrafine cellulose fibers even in a liquid containing a salt. If ultrafine cellulose fibers are uniformly dispersible in a liquid containing a salt, the ultrafine cellulose fibers can be uniformly dispersed in seawater, salt-containing cosmetics, food products, drinks, and the like. For example, in drilling, a mixture of a thickener with a drilling liquid is used, and seawater may be used as a solvent for dispersing the thickener. Thus, it is desirable that ultrafine cellulose fibers should be uniformly (favorably) dispersed even in seawater.

Natural resources present in subterranean formations or zones, such as gas, petroleum, and water are usually recovered by making a borehole so as to reach a subterranean formation while circulating a drilling fluid in the borehole. A fluid for subterranean formation processing such as a fracturing fluid, mud water, a cementing fluid, a well control fluid, a well kill fluid, an acid fracturing fluid, an acid diverting fluid, a stimulation fluid, a sand control fluid, a completion fluid, a wellbore consolidation fluid, a remediation treatment fluid, a spacer fluid, a drilling fluid, a frac-packing fluid, a water conformance fluid, or a gravel packing fluid is used for the recovery of petroleum or gas. Most of these fluids employ a thickener, for example, a natural polysaccharide such as xanthan gum, a cellulose derivative such as carboxymethylcellulose, or a synthetic polymer such as polyacrylamide or polyvinyl alcohol.

Meanwhile, fine cellulose fibers (Patent Literature 1) and cellulose nanowhiskers produced by an acid hydrolysis method (Patent Literature 2) are known as components of thickeners for such purposes. Also, a composition for subterranean formation processing comprising nanocrystalline cellulose has been proposed (Patent Literature 3). In recent years, a revolutionary method for producing nanosized ultrafine cellulose fibers with cellulose crystallinity maintained has been further developed (Non Patent Literature 1). In this method, an aldehyde group or a carboxy group is introduced to the surface of cellulose fibers, followed by machine processing to generate fine cellulose fibers. This method can achieve super-ultrafine fiber formation through an electrostatic repulsion effect. Also, the obtained ultrafine fibers can assume a stably dispersed state in water without being aggregated. Use of the ultrafine cellulose fibers produced by this method in cosmetic thickeners or drilling thickeners has been proposed (Patent Literatures 4 and 5).

It has been reported that nanowhiskers cannot be stably dispersed in water containing a salt because their electrostatic repulsion effect is weakened by the compression of the electrical double layer (Non Patent Literature 2). The technique of obtaining cellulose aggregates in the form of ultrafine fibers by use of a coagulant comprising a salt of a polyvalent metal has been developed (Patent Literature 6). Only the technique of dispersing ultrafine cellulose fibers in a very low concentration of salt water has been developed as the technique of uniformly dispersing ultrafine cellulose fibers in a liquid containing a salt. It has not been shown that ultrafine cellulose fibers are dispersible in a high concentration of salt water. In addition, chemically modified ultrafine cellulose fibers have not been used (Patent Literature 7).

PRIOR ART LITERATURES

Patent Literatures

Patent Literature 1: U.S. Pat. No. 6,348,436
Patent Literature 2: US2013/0196883
Patent Literature 3: US2013/0274149
Patent Literature 4: JP Patent Publication (Kokai) No. 2010-37348 A (JP Patent No. 5296445)
Patent Literature 5: US2013/0035263
Patent Literature 6: WO2014/024876
Patent Literature 7: JP Patent Publication (Kokai) No. 2006-8857

Non Patent Literatures

Non Patent Literature 1: Saito T & al., Homogeneous suspensions of individualized microfibrils from TEMPO-catalyzed oxidation of native cellulose. Biomacromolecules 2006, 7 (6), 1687-91
Non Patent Literature 2: Araki. J. Electrostatic or steric?—preparation and characterizations of well-dispersed systems containing rod-like nanowhiskers of crystalline polysaccharides, Soft Matter, 2013, 9, 4125-4141

SUMMARY OF INVENTION

Object to be Solved by the Invention

In the case of, for example, processing a subterranean formation of the sea bottom, a subterranean formation processing fluid is often supplemented with salt water. A formula containing a salt such as an inorganic salt is also used for purposes such as cosmetics or food products. Therefore, there is a demand for the development of a technique by which ultrafine cellulose is stably dispersed in a liquid containing a salt (hereinafter, "salt water" is also included in the definition of the "liquid containing a salt") and the ultrafine cellulose fibers can sufficiently exert their functions (e.g., functions as a thickener). As for ultrafine cellulose fibers usually prepared as a suspension having a low concentration, desirably, the suspension is temporarily prepared in the form of a concentrate or a dried product from the viewpoint of transport and store, and the concentrate or the dried product can be uniformly re-dispersed in a liquid containing a salt, or the concentrate or the dried product can be re-dispersed in a salt-free liquid and then uniformly dispersed when a salt is added. For example, the preparation of a subterranean formation processing fluid requires re-dispersing the concentrate or the dried product in a liquid containing a salt, for use.

Means for Solving the Object

In light of these circumstances, the present inventors have studied a technique that permits stable dispersion even in salt water. As a result, the present inventors have found that ultrafine fibers are mixed with a water-soluble polymer under particular conditions and can thereby be stably dispersed even in a liquid containing a salt. The present inventors have also found that ultrafine fibers are mixed with a water-soluble polymer and can thereby be re-dispersed in a liquid even after a concentration step. On the basis of these findings, the present invention has been completed.

The present invention provides the following:

[1] A salt water thickener comprising the following components:
ultrafine cellulose fibers, and
a water-soluble polymer.

[2] The thickener according to [1] above, wherein an amount of the water-soluble polymer contained with respect to 1 part by mass of the ultrafine cellulose fibers is 0.05 to 50 parts by mass.

[3] The thickener according to [1] or [2] above, wherein the ultrafine cellulose fibers are in the form of a concentrate or a dried product containing 6% by mass or larger thereof.

[4] The thickener according to any of [1] to [3] above, wherein the salt water described in [1] above comprises an inorganic salt.

[5] The thickener according to any one of [1] to [4] above, wherein the ultrafine cellulose fibers have a substituent, and the substituent is an anion group.

[6] The thickener according to any one of [1] to [5] above, wherein the substituent is any group selected from the group consisting of a carboxylic acid-derived group, a sulfonic acid-derived group, and a phosphoric acid-derived group.

[7] The thickener according to any one of [1] to [6] above, wherein the ultrafine cellulose fibers have 0.1 to 3.0 mmol/g of the substituent.

[8] A fluid comprising a thickener according to any one of [1] to [7] above, a salt, and water.

[9] The fluid according to [8] above which is a fracturing fluid, mud water, a cementing fluid, a well control fluid, a well kill fluid, an acid fracturing fluid, an acid diverting fluid, a stimulation fluid, a sand control fluid, a completion fluid, a wellbore consolidation fluid, a remediation treatment fluid, a spacer fluid, a drilling fluid, a frac-packing fluid, a water conformance fluid, or a gravel packing fluid.

[10] A method for producing the fluid according to [8] or [9] above, comprising steps of: mixing ultrafine cellulose fibers, a water-soluble polymer, and water to obtain a mixture; and adding a salt to the obtained mixture.

[11] A method for processing a subterranean formation, comprising using a fluid according to [8] or [9] above.

The present invention also provides the following:

[1] A composition comprising the following components:
ultrafine cellulose fibers, and
a water-soluble polymer.

[2] The composition according to [1] above, wherein the ultrafine cellulose fibers are stably dispersed in a liquid containing a salt.

[3] The composition according to claim 1 or 2, wherein an amount of the water-soluble polymer contained with respect to 1 part by mass of the ultrafine cellulose fibers is 0.05 to 50 parts by mass.

[4] The composition according to any one of [1] to [3] above, wherein the ultrafine cellulose fibers are in the form of a concentrate or a dried product containing 6% by mass or larger thereof.

[5] The composition according to any one of [1] to [4] above, wherein the ultrafine cellulose fibers have a substituent, and the substituent is an anion group.

[6] The composition according to any one of [1] to [5] above, wherein the substituent is any group selected from the group consisting of a carboxyl group, a sulfone group, and a phosphoric acid group.

[7] The composition according to any one of [1] to [6] above, wherein the ultrafine cellulose fibers have 0.1 to 3.0 mmol/g of the substituent.

[8] A fluid comprising a composition according to any one of [1] to [7] above.

[9] The fluid according to [8] above which is a fracturing fluid, mud water, a cementing fluid, a well control fluid, a well kill fluid, an acid fracturing fluid, an acid diverting fluid, a stimulation fluid, a sand control fluid, a completion fluid, a wellbore consolidation fluid, a remediation treatment fluid, a spacer fluid, a drilling fluid, a frac-packing fluid, a water conformance fluid, or a gravel packing fluid.

[10] A method for processing a subject, comprising using a fluid according to [8] or [9] above comprising the following components:
ultrafine cellulose fibers, and
a water-soluble polymer.

The present invention also provides the following:

[1] A subterranean formation processing composition comprising the following components:
ultrafine cellulose fibers, and
a water-soluble polymer.

[2] The composition according to [1] above, wherein the ultrafine cellulose fibers are stably dispersed when the composition is used such that the ultrafine cellulose fibers are of 0.05 to 2% by mass in a fluid having a salt concentration exceeding a concentration effective for the stable dispersion of the ultrafine cellulose fibers.

[3] The composition according to [1] above, wherein the ultrafine cellulose fibers are uniformly dispersed in a liquid obtained by mixing the composition such that the ultrafine cellulose fibers are of 0.4% by mass in an aqueous solution containing 1% by mass of NaCl, and/or the liquid has a viscosity of 3000 mPa·s or higher.

[4] The composition according to any one of [1] to [3] above, wherein the ultrafine cellulose fibers have a substituent, and the substituent is an anion group.

[5] The composition according to [4] above, wherein the substituent is any group selected from the group consisting of a carboxyl group, a sulfone group, and a phosphoric acid group.

[6] The composition according to [4] or [5] above, wherein the ultrafine cellulose fibers have 0.1 to 3.0 mmol/g of the substituent.

[7] The composition according to any one of [1] to [6] above which is produced by a production method comprising a step of mixing the water-soluble polymer with a suspension containing smaller than 6% by mass of the ultrafine cellulose fibers, wherein the suspension is free from a salt or contains a salt at a concentration effective for the stable dispersion of the ultrafine cellulose fibers.

[8] The composition according to any one of [1] to [7] above, wherein the ultrafine cellulose fibers are in the form of a concentrate or a dried product containing 6 to 80% by mass thereof.

[9] A drilling fluid comprising a composition according to any one of [1] to [8] above.

[10] A method for producing a subterranean formation processing fluid, comprising steps of:
mixing a water-soluble polymer with a suspension containing smaller than 6% by mass of ultrafine cellulose fibers to obtain a composition comprising the ultrafine cellulose fibers and the water-soluble polymer, wherein the suspension is free from a salt or contains a salt at a concentration effective for the stable dispersion of the ultrafine cellulose fibers; and mixing the obtained composition with a fluid having a salt concentration of 0.1% by mass or larger.

[11] A method for processing a subterranean formation, comprising using a fluid comprising the following components and having a salt concentration of 0.1% by mass or larger:
ultrafine cellulose fibers, and
a water-soluble polymer.

[12] A method for processing a subterranean formation, comprising processing the subterranean formation with a fracturing fluid, mud water, a cementing fluid, a well control fluid, a well kill fluid, an acid fracturing fluid, an acid diverting fluid, a stimulation fluid, a sand control fluid, a completion fluid, a wellbore consolidation fluid, a remediation treatment fluid, a spacer fluid, a drilling fluid, a frac-packing fluid, a water conformance fluid, or a gravel packing fluid, which comprises the composition according to any of [1] to [8] above.

Advantageous Effects of Invention

According to the present invention, ultrafine fibers are mixed with a water-soluble polymer, whereby the ultrafine cellulose fibers can be stably dispersed even in a liquid containing a salt (electrolyte). Therefore, a composition comprising ultrafine fibers and a water-soluble polymer exerts a high viscosity.

BRIEF DESCRIPTION OF DRAWINGS

FIG. 1 is a microscope observation photograph (left) and a transmission electron microscope observation photograph (right) of cellulose fibers 1 obtained in Production Example 1.

FIG. 2 is a microscope observation photograph (left) and a transmission electron microscope observation photograph (right) of cellulose fibers 2 obtained in Production Example 2.

FIG. 3 shows 3 regions in the measurement of the amount of a substituent by a conductometric titration method.

EMBODIMENTS FOR CARRYING OUT THE INVENTION

Hereinafter, the present invention will be described in more detail. Materials, methods, and numeric ranges, etc., described in the present specification, are given for illustrating embodiments of the present invention and are not intended to limit the scope of the invention. Furthermore, use of the other materials, methods, and numeric values, etc., is not excluded.

The range "X to Y" includes both of the values X and Y. The terms "%" and "part" represent a percentage or a proportion based on mass unless otherwise specified.

[Salt Water Thickener]

The present invention provides a composition that comprises ultrafine cellulose fibers and a water-soluble polymer and is suitable as a thickener for salt water (salt water thickener). The composition of the present invention can be used in subterranean formation processing, etc.

<Ultrafine Cellulose Fibers>

Examples of the cellulose raw material include, but are not particularly limited to: papermaking pulp; cotton-based pulp such as cotton linter and cotton lint; non-wood-based pulp such as linen, straw, and bagasse; and cellulose isolated from sea squirt, seaweed, or the like. Among them, papermaking pulp is preferred from the viewpoint of easy availability, though the cellulose raw material is not limited thereto. Examples of the papermaking pulp include hardwood kraft pulp (leaf bleached kraft pulp (LBKP), leaf unbleached kraft pulp (LUKP), leaf oxygen-bleached kraft pulp (LOKP), etc.), and softwood kraft pulp (needle bleached kraft pulp (NBKP), needle unbleached kraft pulp (NUKP), needle oxygen-bleached kraft pulp (NOKP), etc.). Further examples thereof include, but are not particularly limited to: chemical pulp such as sulfite pulp (SP) and alkaline pulp (AP): semichemical pulp such as semichemical pulp (SCP) and chemiground wood pulp (CGP); mechanical pulp such as ground pulp (GP) and thermomechanical pulp (TMP and BCTMP); non-wood pulp prepared from a raw material such as *Broussonetia papyrifera*, *Edgeworthia chrysantha*, linen, or kenaf; and deinking pulp prepared using used paper as a raw material. Among them, kraft pulp, deinking pulp, or sulfite pulp is preferred because of easier availability, though the cellulose raw material is not particularly limited thereto. One of these cellulose raw materials may be used alone, or two or more thereof may be used as a mixture.

In the present invention, the term "cellulose fibers" includes coarse cellulose fibers and ultrafine cellulose fibers unless otherwise specified.

The average fiber width of the coarse cellulose fibers (also simply referred to as the coarse fibers) is, for example, 1 μm or larger, preferably 5 μm or larger, more preferably 10 μm or larger, observed under an electron microscope.

The average fiber width of the ultrafine cellulose fibers (also simply referred to as the ultrafine fibers) is not particularly limited and is preferably 2 to 1000 nm, more preferably 2 to 100 nm, more preferably 2 to 50 nm, further preferably 2 nm to 10 nm, observed under an electron microscope. If the average fiber width of the ultrafine cellulose fibers is smaller than 2 nm, the resulting ultrafine cellulose fibers are dissolved as cellulose molecules in water and therefore no longer exert their physical properties (strength, rigidity, and dimensional stability). In this context, the type I crystal structure assumed by the ultrafine cellulose fibers can be identified in a diffraction profile obtained by wide-angle x-ray diffraction photography using CuKα ($\lambda$=1.5418 angstroms) monochromatized with graphite. Specifically, this structure can be identified from its typical peaks at two positions of 2θ=approximately 14 to 17° and 2θ=approximately 22 to 23° C.

The fiber widths of the cellulose fibers are measured by observation under an electron microscope as follows: an aqueous suspension containing the cellulose fibers having a concentration of 0.05 to 0.1% by mass is prepared, and the suspension is casted onto a hydrophilized carbon film-coated grid to prepare a sample for TEM observation. If the sample contains wide fibers, SEM images of the surface of the suspension casted onto glass may be observed. The sample is observed using electron microscope images taken at a magnification of 1000×, 5000×, 10000×, or 50000× according to the widths of the constituent fibers. However, the sample, the observation conditions, and the magnification are adjusted so as to satisfy the following conditions:

(1) one straight line X is drawn at an arbitrary site in an observation image, and 20 or more fibers intersect the straight line X; and (2) a straight line Y vertically intersecting the straight line in the same image is drawn, and 20 or more fibers intersect the straight line Y.

The widths of the fibers interlocking the straight line X and the straight line Y are visually read for observation images that satisfy the conditions described above. In this way, 3 or more images of at least surface portions that do not overlap with each other are observed, and the widths of the fibers interlocking the straight line X and the straight line Y is read for each of the images. In this way, the fiber widths of at least 20 fibers×2×3=120 fibers are read. The average fiber width (also simply referred to as the "fiber width") of the cellulose fibers is the average value of the fiber widths thus read.

The fiber length of the ultrafine cellulose fibers is not particularly limited and is preferably 0.1 to 1000 µm, more preferably 0.1 to 800 µm, particularly preferably 0.1 to 600 µm. If the fiber length is smaller than 0.1 µm, the ultrafine cellulose fibers cannot exert their original physical properties because their crystalline regions are also destroyed. If the fiber length exceeds 1000 µm, slurry of the resulting ultrafine fibers has a very high viscosity and thus becomes less handleable. The fiber length can be determined by image analysis using TEM, SEM, or AFM.

<Chemical Treatment>

In the present invention, ultrafine cellulose fibers having a substituent such as a phosphoric acid group or a substituent derived from the phosphoric acid group (hereinafter, the phosphoric acid group and the substituent derived from the phosphoric acid group are also referred to as a phosphoric acid-derived group), a sulfonic acid group or a substituent derived from the sulfonic acid group (hereinafter, the sulfonic acid group and the substituent derived from the sulfonic acid group are also referred to as a sulfonic acid-derived group) phosphoric acid-derived group, or a carboxy group or a substituent derived from the carboxy group (hereinafter, the carboxy group and the substituent derived from the carboxy group are also referred to as a carboxylic acid-derived group), which are obtained by the chemical treatment and defibration treatment of a cellulose raw material, can be used as the ultrafine cellulose fibers. The ultrafine cellulose fibers having a substituent are preferred because super-ultrafine fiber formation can be achieved through an electrostatic repulsion effect. The ultrafine cellulose fibers having a substituent can be stable in water through the electrostatic repulsion effect without being aggregated, and on the other hand, are difficult to stably disperse in water containing a salt because the effect is weakened. Therefore, the application of the present invention is particularly suitable for stabilizing the ultrafine cellulose fibers even in water containing a salt and allowing the ultrafine cellulose fibers to exert a thickening effect.

The chemical treatment method for the cellulose raw material is not particularly limited as long as the method can yield the ultrafine fibers. Examples thereof include, but are not limited to, acid treatment, ozone treatment, TEMPO oxidation treatment, enzyme treatment, and treatment with a compound capable of forming a covalent bond with a functional group in the cellulose or fiber raw material.

One example of the acid treatment can include, but are not particularly limited to, a method described in Otto van den Berg; Jeffrey R. Capadona; Christoph Weder; Biomacromolecules 2007, 8, 1353-1357. Specifically, the cellulose fibers are subjected to hydrolysis treatment with sulfuric acid, hydrochloric acid, or the like. High-concentration acid treatment produces short fibers (also called cellulose nanocrystals) by decomposing most of non-crystalline regions. These short fibers are also included in the ultrafine cellulose fibers.

One example of the ozone treatment can include, but are not particularly limited to, a method described in JP Patent Publication (Kokai) No. 2010-254726 A. Specifically, the fibers are subjected to the ozone treatment and then dispersed in water, followed by the crushing treatment of the obtained aqueous suspension of the fibers.

One example of the TEMPO oxidation can include, but are not particularly limited to, a method described in Saito T & al. Homogeneous suspensions of individualized microfibrils from TEMPO-catalyzed oxidation of native cellulose. Biomacromolecules 2006, 7 (6), 1687-91. Specifically, the fibers are subjected to the TEMPO oxidation treatment and then dispersed in water, followed by the crushing treatment of the obtained aqueous suspension of the fibers.

One example of the enzyme treatment can include, but are not particularly limited to, a method described in Japanese Patent Application No. 2012-115411 (the contents described in Japanese Patent Application No. 2012-115411 are incorporated herein by reference in its entirety). Specifically, this method involves treating the fiber raw material with an enzyme at least under a condition where the ratio between the EG activity and the CBHI activity of the enzyme is 0.06 or more.

The EG activity is measured and defined as described below.

A substrate solution (concentration: 100 mM, containing an acetic acid-sodium acetate buffer solution of pH 5.0) of carboxylmethylcellulose having a concentration of 1% (W/V) (CMCNa High viscosity; Cat No. 150561, MP Biomedicals, Inc.) is prepared. An enzyme for assay is diluted (any dilution ratio at which the absorbance of an enzyme solution given below can apply to a calibration curve obtained from glucose standard solutions given below) with a buffer solution (same as above) in advance. To 90 µl of the substrate solution, 10 µl of the enzyme solution obtained by the dilution is added and reacted therewith at 37° C. for 30 minutes.

In order to prepare a calibration curve, ion-exchange water (blank) and glucose standard solutions (concentration: at least 4 standard solutions differing in concentration from 0.5 to 5.6 mM) are selected, and 100 µl each thereof is prepared and incubated at 37° C. for 30 minutes.

After the reaction, 300 µl of a DNS coloring solution (1.6% by mass of NaOH, 1% by mass of 3,5-dinitrosalicylic acid, and 30% by mass of potassium sodium tartrate) is added to each of the enzyme-containing solution, the blank for a calibration curve, and the glucose standard solutions, and the mixture is boiled for 5 minutes to develop color. Immediately after the color development, the reaction solution is cooled in ice, and 2 ml of ion-exchange water is added thereto, followed by well mixing. The mixture is left standing for 30 minutes, and the absorbance is measured within 1 hour thereafter.

For the absorbance measurement, 200 µl of the reaction solution is added to each well of a 96-well microwell plate (e.g., 269620, manufactured by Nalge Nunc International), and the absorbance at 540 nm can be measured using a microplate reader (e.g., Infinite M200, manufactured by Tecan Trading AG).

A calibration curve is prepared using the absorbance of each glucose standard solution from which the absorbance of the blank has been subtracted, and the glucose concentration. The amount of reducing sugar formed corresponding to glucose in the enzyme solution is calculated by subtracting the absorbance of the blank from the absorbance of the enzyme solution and then using the calibration curve (when the absorbance of the enzyme solution does not apply to the calibration curve, the dilution ratio for diluting the enzyme with the buffer solution as described above is changed, followed by re-measurement). The amount of the enzyme that forms 1 μmole of glucose-equivalent reducing sugar for 1 minute is defined as 1 unit. The EG activity can be determined according to the following expression:

EG activity=Amount of reducing sugar formed corresponding to glucose (mole) in 1 ml of the enzyme solution obtained by dilution with the buffer solution/30 min×Dilution ratio

[see Sakuzo Fukui, "Experimental Methods of Biochemistry (Quantitative Determination of Reducing Sugar) 2nd edition", Gakkai Shuppan Center Co., Ltd., p. 23 to 24 (1990)].

The CBHI activity is measured and defined as described below.

32 μl of 1.25 mM 4-methylumbelliferyl-cellobioside (concentration: 1 dissolved in an acetate-sodium acetate buffer solution of pH 5.0) is added to each well of a 96-well microwell plate (e.g., 269620, manufactured by Nalge Nunc International). 4 μl of 100 mM glucono-1,5-lactone is added to each well. Further, 4 μl of a solution containing an enzyme for assay diluted (any dilution ratio at which the fluorescence intensity of an enzyme solution given below can apply to a calibration curve obtained from standard solutions given below) with the same buffer solution as above is added to each well and reacted therewith at 37° C. for 30 minutes. Then, the reaction is terminated by the addition of a 500 mM glycine-NaOH buffer solution (pH 10.5) at 200 μl/well.

40 μl each of 4-methyl-umbelliferon standard solutions (concentration: at least 4 standard solutions differing in concentration from 0 to 50 μM) is added as a standard solution for a calibration curve to each well of the same 96-well microwell plate as above and warmed at 37° C. for 30 minutes. Then, 200 μl of a 500 mM glycine-NaOH buffer solution (pH 10.5) is added to each well.

The fluorescence intensity at 350 nm (excitation light: 460 nm) is measured using a microplate reader (e.g., Fluoroskan Ascent FL, manufactured by Thermo Labsystems Inc.). The amount of 4-methyl-umbelliferon formed in the enzyme solution is calculated using the calibration curve prepared from the data on the standard solutions (when the fluorescence intensity of the enzyme solution does not apply to the calibration curve, the dilution ratio is changed, followed by re-measurement). The amount of the enzyme that forms 1 μmole of 4-methyl-umbelliferon for 1 minute is defined as 1 unit. The CBHI activity can be determined according to the following expression:

CBH1 activity=Amount of 4-methyl-umbelliferon formed (μmole) in 1 ml of the diluted enzyme solution/30 min×Dilution ratio.

Examples of the treatment with a compound capable of forming a covalent bond with a functional group in the cellulose or fiber raw material can include, but are not particularly limited to, the following methods:

treatment with a compound having a quaternary ammonium group described in JP Patent Publication (Kokai) No. 2011-162608 A;

a method using a carboxylic acid compound described in JP Patent Publication (Kokai) No. 2013-136859 A;

a method using "at least one compound selected from an oxo acid and polyoxo acid containing a phosphorus atom in their structures, and salts thereof" described in International Publication No. WO2013/073652 (PCT/JP2012/079743); and a method using carboxymethylation reaction described in JP Patent Publication (Kokai) No. 2013-185122 A.

<Substituent Introduction>

In a particularly preferred aspect of the present invention, the ultrafine cellulose fibers have an anionic group. In a more preferred aspect, the ultrafine cellulose fibers have any group selected from the group consisting of a phosphoric acid-derived group, a sulfonic acid-derived group, and a carboxylic acid-derived group. In a particularly preferred aspect, the ultrafine cellulose fibers have a phosphoric acid-derived group.

(Amount of Substituent Introduced)

The amount of the substituent introduced is not particularly limited and is 0.1 to 3.0 mmol/g, preferably 0.14 to 2.5 mmol/g, more preferably 0.2 to 2.0 mmol/g, particularly preferably 0.2 to 1.8 mmol/g, with respect to 1 g (mass) of the ultrafine cellulose fibers. If the amount of the substituent introduced is smaller than 0.1 mmol/g, the ultrafine fiber formation from the fiber raw material is difficult. The resulting ultrafine cellulose fibers have poor stability. If the amount of the substituent introduced exceeds 3.0 mmol/g, an adequate viscosity cannot be obtained.

(Step of Introducing Phosphoric Acid-Derived Group)

Hereinafter, phosphoric acid esterification for introducing the phosphoric acid-derived group will be described as a typical example. Those skilled in the art can understand that the description is also appropriately applied to the case of having other groups.

A method for producing the phosphoric acid esterified ultrafine cellulose fibers of the present embodiment comprises a step of introducing phosphoric acid-derived group. The step of introducing phosphoric acid-derived group is the step of allowing a compound having a phosphoric acid-derived group or/and a salt thereof (hereinafter, referred to as "compound A") to act on the fiber raw material including cellulose in the presence of urea or/and a derivative thereof (hereinafter, referred to as "compound B"). As a result, the phosphoric acid group is introduced to a hydroxy group in the cellulose fibers.

The step of introducing phosphoric acid-derived group inevitably comprises the step of introducing a phosphoric acid-derived group to cellulose and may comprise, if desired, an alkali treatment step mentioned later, a step of washing off redundant reagents, etc.

One example of the method for allowing compound A to act on the fiber raw material in the presence of compound B includes a method of mixing the fiber raw material in a dry or wet state with a powder or an aqueous solution of compound A and compound B. Another example thereof includes a method of adding a powder or an aqueous solution of compound A and compound B to slurry of the fiber raw material. Among them, a method of adding an aqueous solution of compound A and compound B to the fiber raw material in a dry state, or a method of adding a powder or an aqueous solution of compound A and compound B to the fiber raw material in a wet state is preferred because of the high homogeneity of the reaction, though the method is not particularly limited thereto. Compound A and compound B may be added at the same time or may be added separately. Alternatively, compound A and compound B to be subjected to the reaction may be first added as an aqueous solution, which is then compressed to squeeze out redundant chemicals. The form of the fiber raw material is preferably a cotton-like or thin sheet form, though the form is not particularly limited thereto.

The compound A used in the present embodiment is a compound having a phosphoric acid-derived group or/and a salt thereof.

Examples of the compound having a phosphoric acid-derived group include, but are not particularly limited to, phosphoric acid, lithium salts of phosphoric acid, sodium salts of phosphoric acid, potassium salts of phosphoric acid, and ammonium salts of phosphoric acid. Examples of the lithium salts of phosphoric acid include lithium dihydrogen phosphate, dilithium hydrogen phosphate, trilithium phosphate, lithium pyrophosphate, and lithium polyphosphate. Examples of the sodium salts of phosphoric acid include sodium dihydrogen phosphate, disodium hydrogen phosphate, trisodium phosphate, sodium pyrophosphate, and sodium polyphosphate. Examples of the potassium salts of phosphoric acid include potassium dihydrogen phosphate, dipotassium hydrogen phosphate, tripotassium phosphate, potassium pyrophosphate, and potassium polyphosphate. Examples of the ammonium salts of phosphoric acid include ammonium dihydrogen phosphate, diammonium hydrogen phosphate, triammonium phosphate, ammonium pyrophosphate, and ammonium polyphosphate.

Among them, phosphoric acid, a sodium salt of phosphoric acid, a potassium salt of phosphoric acid, or an ammonium salt of phosphoric acid is preferred from the viewpoint of the high efficiency of introducing phosphoric acid-derived group, higher improvement in defibration efficiency in a defibration step described below, low cost, and industrial applicability. Sodium dihydrogen phosphate or disodium hydrogen phosphate is more preferred, though the compound A is not particularly limited thereto.

The compound A is preferably used as an aqueous solution because of the enhanced homogeneity of the reaction and the increased efficiency of introducing phosphoric acid-derived group, though the form is not particularly limited thereto. The pH of the aqueous solution of the compound A is not particularly limited and is preferably 7 or lower because of the increased efficiency of introducing phosphoric acid-derived group, more preferably 3 to 7 from the viewpoint of suppressing the hydrolysis of pulp fibers. The pH may be adjusted, for example, by using an acidic compound having a phosphoric acid-derived group and an alkaline compound having a phosphoric acid-derived group in combination and changing the ratio between their amounts. Alternatively, the pH may be adjusted, for example, by adding an inorganic alkali or an organic alkali to an acidic compound having a phosphoric acid-derived group.

The amount of the compound A added to the fiber raw material is not particularly limited. When the amount of the compound A added is converted to the amount of a phosphorus atom, the amount of the phosphorus atom added to the fiber raw material is preferably 0.5 to 100% by mass, more preferably 1 to 50% by mass, most preferably 2 to 30% by mass. When the amount of the phosphorus atom added to the fiber raw material falls within the range of 0.5 to 100% by mass, the yield of the ultrafine cellulose fibers can be further improved. If the amount of the phosphorus atom added to the fiber raw material exceeds 100% by mass, this is not preferred because the effect of improving the yield levels off and cost of the compound A used is elevated. On the other hand, if the amount of the phosphorus atom added to the fiber raw material is lower than 0.5% by mass, this is not preferred because an adequate yield cannot be obtained.

Examples of the compound B used in the present embodiment include, but are not particularly limited to, urea, thiourea, biuret, phenyl urea, benzyl urea, dimethyl urea, diethyl urea, tetramethyl urea, benzoylene urea, and hydantoin. Among them, urea is preferred because urea requires low cost, is easily handled, and easily forms a hydrogen bond with the fiber raw material having a hydroxyl group.

The compound B, as with the compound A, is preferably used as an aqueous solution, though the form is not particularly limited thereto. An aqueous solution containing both of the compound A and the compound B dissolved therein is preferably used because of the enhanced homogeneity of the reaction, though the form is not particularly limited thereto.

The amount of the compound B added to the fiber raw material is not particularly limited and is preferably 1 to 300% by mass.

The reaction system may contain an amide or an amine in addition to the compound A and the compound B. Examples of the amide include formamide, dimethylformamide, acetamide, and dimethylacetamide. Examples of the amine include methylamine, ethylamine, trimethylamine, triethylamine, monoethanolamine, diethanolamine, triethanolamine, pyridine, ethylenediamine, and hexamethylenediamine. Among them, particularly, triethylamine is known to work as a favorable reaction catalyst.

The amount of the phosphoric acid-derived group introduced is not particularly limited and is 0.1 to 3.0 mmol/g, preferably 0.14 to 2.5 mmol/g, more preferably 0.2 to 2.0 mmol/g, particularly preferably 0.2 to 1.8 mmol/g, with respect to 1 g (mass) of the ultrafine cellulose fibers. If the amount of the substituent introduced is smaller than 0.1 mmol/g, the ultrafine fiber formation from the fiber raw material is difficult. The resulting ultrafine cellulose fibers have poor stability. If the amount of the substituent introduced exceeds 3.0 mmol/g, an adequate viscosity cannot be obtained.

The amount of the phosphoric acid-derived group introduced to the fiber raw material is measured by a conductometric titration method which involves performing ultrafine fiber formation by the defibration treatment step, treating the obtained slurry containing the ultrafine cellulose fibers with an ion-exchange resin, and then determining change in electrical conductivity while adding an aqueous sodium hydroxide solution thereto.

The conductometric titration confers a curve shown in FIG. 1 as an alkali is added. First, the electrical conductivity is abruptly reduced (hereinafter, this region is referred to as the "first region"). Then, the conductivity starts to rise slightly (hereinafter, this region is referred to as the "second region"). Then, the increment of the conductivity is increased (hereinafter, this region is referred to as the "third region"). In short, three regions appear. The amount of the alkali required for the first region among these regions is equal to the amount of a strongly acidic group in the slurry used in the titration. The amount of the alkali required for the second region is equal to the amount of a weakly acidic group in the slurry used in the titration. When the condensation of the phosphoric acid-derived group occurs, the weakly acidic group is apparently lost so that the amount of the alkali required for the second region is decreased as compared with the amount of the alkali required for the first region. On the other hand, the amount of the strongly acidic group agrees with the amount of the phosphorus atom regardless of the presence or absence of condensation. Therefore, the simple term "amount of the phosphoric acid-derived group introduced (or amount of the phosphoric acid-derived group)" or "amount of the substituent introduced (or amount of the substituent)" refers to the amount of the strongly acidic group.

(Alkali Treatment)

In the case of producing the phosphorylated ultrafine fibers, alkali treatment can be performed between the step of introducing phosphoric acid-derived group and a defibration treatment step mentioned later. Examples of the alkali treatment method include, but are not particularly limited to, a method of dipping the phosphoric acid-derived group-introduced fibers in an alkali solution.

The alkali compound contained in the alkali solution is not particularly limited and may be an inorganic alkali compound or may be an organic alkali compound. The solvent in the alkali solution may be water or an organic solvent and is not particularly limited. The solvent is preferably a polar solvent (water or a polar organic solvent such as an alcohol), more preferably an aqueous solvent containing at least water.

Among these alkali solutions, an aqueous sodium hydroxide solution or an aqueous potassium hydroxide solution is particularly preferred because of high versatility, though the alkali solution is not particularly limited thereto.

The temperature of the alkali solution in the alkali treatment step is not particularly limited and is preferably 5 to 80° C., more preferably 10 to 60° C.

The dipping time in the alkali solution in the alkali treatment step is not particularly limited and is preferably 5 to 30 minutes, more preferably 10 to 20 minutes.

The amount of the alkali solution used in the alkali treatment is not particularly limited and is preferably 100 to 100000% by mass, more preferably 1000 to 10000% by mass, with respect to the absolute dry mass of the phosphoric acid-introduced fibers.

In order to decrease the amount of the alkali solution used in the alkali treatment step, the phosphoric acid-derived group-introduced fibers may be washed with water or an organic solvent before the alkali treatment step. After the alkali treatment, it is preferred for improving handleability to wash the alkali-treated phosphoric acid-derived group-introduced fibers with water or an organic solvent before the defibration treatment step, though the method is not particularly limited thereto.

<Defibration Treatment>

The super-ultrafine fibers obtained as described above can be subjected to defibration treatment in a defibration treatment step. In the defibration treatment step, the fibers are usually defibrated using a defibration treatment apparatus to obtain slurry containing ultrafine fibers. The treatment apparatus and the treatment method are not particularly limited.

A high-speed defibrator, a grinder (stone mill-type crusher), a high-pressure homogenizer, an ultrahigh-pressure homogenizer, a high-pressure collision-type crusher, a ball mill, a bead mill, or the like can be used as the defibration treatment apparatus. Alternatively, for example, a wet milling apparatus such as a disc-type refiner, a conical refiner, a twin-screw kneader, an oscillation mill, a homomixer under high-speed rotation, an ultrasonic disperser, or a beater may be used as the defibration treatment apparatus. The defibration treatment apparatus is not limited to those described above.

Preferred examples of the defibration treatment method include, but are not particularly limited to, a high-speed defibrator, a high-pressure homogenizer, and an ultrahigh-pressure homogenizer which are less influenced by milling media and have a small risk of contamination.

For the defibration treatment, the fiber raw material is preferably diluted into slurry using water and an organic solvent each alone or in combination, though the method is not particularly limited thereto. Water as well as a polar organic solvent can be used as a dispersion medium. Preferred examples of the polar organic solvent include, but are not particularly limited to, alcohols, ketones, ethers, dimethyl sulfoxide (DMSO), dimethylformamide (DMF), and dimethylacetamide (DMAc). Examples of the alcohols include methanol, ethanol, n-propanol, isopropanol, n-butanol, and t-butyl alcohol. Examples of the ketones include acetone and methyl ethyl ketone (MEK). Examples of the ethers include diethyl ether and tetrahydrofuran (THF). One of these dispersion media may be used, or two or more thereof may be used. The dispersion medium may also contain a solid content other than the fiber raw material, for example, hydrogen-binding urea.

<Water-Soluble Polymer>

In the present invention, the ultrafine cellulose fibers are mixed with a water-soluble polymer in order to stably disperse the ultrafine cellulose fibers in a liquid containing a salt. This effect is marked, particularly, for a liquid containing a salt. The water-soluble polymer is considered to prevent the aggregation of the ultrafine cellulose fibers by steric hindrance caused by a swelling effect in a liquid to stabilize the dispersion. Examples of the salt include, but are not limited to, NaCl, KCl, $CaCl_2$, $MgCl_2$, $(NH_4)_2SO_4$, and $Na_2CO_3$.

Examples of the water-soluble polymer include, but are not particularly limited to: natural water-soluble polymer derivatives such as xanthan gum, alginic acid, guar gum, and pullulan; water-soluble celluloses such as carboxymethylcellulose, methylcellulose, and hydroxyalkylcellulose; starches such as cationized starch, raw starch, oxidized starch, etherified starch, and esterified starch; and polyvinyl alcohol, polyacrylamide, and polymer surfactants. In a particularly preferred aspect, a natural water-soluble polymer derivative, a water-soluble cellulose, and/or a polymer surfactant are preferably used from the viewpoint of favorable miscibility with the ultrafine cellulose fibers having a functional group. Also, xanthan gum, carboxymethylcellulose, or a polycarboxylic acid-type surfactant is preferably used from the viewpoint that the water-soluble polymer has salt resistance in itself, exhibits a high swelling effect even in salt water, and exhibits high dispersibility because of having a functional group. The molecular weight of the water-soluble polymer is not particularly limited as long as the effect of interest can be exerted. Various molecular weights acceptable for the purpose of the salt water thickener used, for example, a molecular weight of tens of thousands to tens of millions, can be used. For example, xanthan gum having a molecular weight of 10,000 to 50,000,000 can be used. The lower limit of the molecular weight of xanthan gum may be, for example, 200,000 or higher or may be 2,000,000 or higher, regardless of the upper limit. Carboxymethylcellulose having a molecular weight of 10,000 to 1,000,000 can be used. A polycarboxylic acid-type surfactant having a molecular weight of 5,000 to 500,000 can be used.

Only one of these water-soluble polymers may be used, or two or more thereof may be used as a mixture.

The amount of the water-soluble polymer contained in the salt water thickener is not particularly limited as long as the amount is effective for enhancing the dispersion stability of the ultrafine cellulose fibers in a liquid containing a salt. The salt concentration in the liquid containing a salt is usually 0.02% by mass or larger. The water-soluble polymer can be contained at 0.05 to 50 parts by mass with respect to 1 part by mass (based on dry weight; hereinafter, the same holds true for the description below unless otherwise specified) of the ultrafine cellulose fibers. The water-soluble polymer is preferably contained at 0.1 to 10 parts by mass, more preferably 0.5 to 5 parts by mass, with respect to 1 part by mass of the ultrafine cellulose fibers. If the amount of the water-soluble polymer contained with respect to 1 part by mass of the ultrafine cellulose fibers is smaller than 0.05 parts by mass, this is not preferred because the water-soluble polymer cannot sufficiently exert a swelling effect (steric hindrance) and is less likely to stably disperse the ultrafine cellulose fibers. On the other hand, if the amount of the water-soluble polymer contained with respect to 1 part by mass of the ultrafine cellulose fibers exceeds 50 parts by mass, this is not preferred because the ultrafine cellulose fibers are less likely to produce a thickening effect.

In the present invention, the ultrafine cellulose fibers and the water-soluble polymer are dispersed in a liquid containing 0.02% by mass or larger of a salt. The content of the salt contained in the salt water thickener of the present invention can be 0.02% by mass or larger.

[Properties of Salt Water Thickener and Preparation Method]

According to the studies of the present inventors, when a suspension (which may be a concentrate liquid or a dried product) containing the ultrafine cellulose fibers at a relatively high concentration of 6% by mass or larger is mixed with a liquid containing a salt, the ultrafine cellulose fibers cannot be dispersed from the high-concentration state, resulting in precipitates or gel masses in some cases. In the present invention, the phrase "ultrafine cellulose fibers are stably dispersed" or "ultrafine cellulose fibers are uniformly dispersed" means that precipitates or gel masses are not formed. More specifically, this phrase means that even when a suspension containing the ultrafine cellulose fibers at a relatively high concentration of 0.05 to 2% by mass in terms of the final concentration of the ultrafine cellulose fibers is mixed with a liquid containing a salt to obtain a fluid having a salt concentration exceeding a concentration effective for the stable dispersion of the ultrafine cellulose fibers, gel masses are not produced and precipitates are not observed (apparent uniform dispersion is visually confirmed), or a given level or higher of viscosity is maintained. The "concentration effective for the stable dispersion of the ultrafine cellulose fibers" of a certain salt means the concentration of the salt at which the ultrafine cellulose fibers are uniformly dispersed without being gelled when the ultrafine cellulose fibers in the form of a concentrate or a dried product containing 6 to 80% by mass thereof are diluted to 0.05 to 2% by mass in terms of the final concentration of the ultrafine cellulose fibers and dispersed in a solvent. For example, as for a monovalent salt, the effective concentration is lower than 1% by mass. The effective concentration of a polyvalent salt (e.g., a divalent salt) is lower than 0.1% by mass. More preferably, the effective concentration of the monovalent salt is lower than 0.75% by mass, and the effective concentration of the polyvalent salt is lower than 0.075% by mass. Further preferably, the effective concentration of the monovalent salt is lower than 0.5% by mass, and the effective concentration of the polyvalent salt is lower than 0.05% by mass.

The studies of the present inventors have further revealed that when a salt is added to the ultrafine cellulose fibers obtained as a cellulose suspension having a relatively low concentration of 6% by mass or lower without mixing the ultrafine cellulose fibers with the water-soluble polymer in advance, the ultrafine cellulose fibers are not stably dispersed due to gelation. However, the ultrafine cellulose fibers have been found to be stably dispersed by mixing the cellulose suspension with a solution of the water-soluble polymer in advance, even if a salt is added. A concentrate obtained by concentrating the ultrafine cellulose suspension without being mixed with the water-soluble polymer failed to be dispersed in water containing a salt, resulting in gel masses. The concentrate of the ultrafine cellulose fibers alone did not exert adequate viscosity even when re-dispersed in water containing a salt and containing the water-soluble polymer. However, a concentrate obtained by mixing the suspension of the ultrafine cellulose fibers with the water-soluble polymer and then concentrating the mixture was able to be stably re-dispersed in a liquid containing a salt.

Thus, for preparing the salt water thickener of the present invention, it is preferred to pay particular attention to the concentration of the ultrafine cellulose fibers in the mixing of the ultrafine cellulose fibers with the water-soluble polymer, and/or the concentration of the salt. In a preferred aspect of the present invention, the ultrafine cellulose fibers are mixed with the water-soluble polymer, as an unconcentrated suspension that has a relatively low concentration, specifically, smaller than 6% by mass of the ultrafine cellulose fibers, and is free from a salt or contains a salt at a concentration effective for the stable dispersion of the ultrafine cellulose fibers. More specifically, the salt concentration at the time of mixing is preferably lower than 1% by mass for a monovalent salt and lower than 0.1% by mass for a polyvalent salt.

The salt water thickener of the present invention is used for preparing, for example, a drilling fluid and used as a drilling fluid with a salt concentration of 0.02% by mass or larger, though the salt concentration is not particularly limited thereto. The upper limit of the salt concentration for use may be the saturating concentration of the salt, may be 10% of the saturating concentration, or may be 1% of the saturating concentration. The fluid may contain plural types of salts.

In the present invention, the water-soluble polymer is mixed with a suspension containing smaller than 6% by mass of the ultrafine cellulose fibers to obtain a salt water thickener comprising the ultrafine cellulose fibers and the water-soluble polymer, wherein the suspension is free from a salt or contains a salt at a concentration effective for the stable dispersion of the ultrafine cellulose fibers. The obtained salt water thickener can be mixed with a fluid having a salt concentration of 0.02% by mass or larger.

Owing to the salt water thickener of the present invention, the ultrafine cellulose fibers can be stably dispersed even in a liquid containing a salt. Whether the dispersion is stable can be evaluated according to the criterion: no gelation occurs, precipitates are not observed (apparent uniform dispersion is visually confirmed), or a given level or higher of viscosity is maintained.

The ultrafine cellulose fibers are not aggregated when the salt water thickener of the present invention is used such that the ultrafine cellulose fibers are of 0.05 to 2% by mass (preferably 0.4% by mass) a fluid having a salt concentration of 0.02% by mass or larger. Alternatively, the ultrafine cellulose fibers are visually confirmed to be uniformly dispersed in a liquid obtained by mixing the salt water thickener such that the ultrafine cellulose fibers are of 0.4% by mass in an aqueous solution containing 1% by mass of NaCl, and/or the liquid obtained by mixing the salt water thickener such that the ultrafine cellulose fibers are of 0.4% by mass in an aqueous solution containing 1% by mass of NaCl has a viscosity of 3000 mPa·s or higher, preferably 6000 mPa·s or higher, more preferably 9000 mPa·s or higher.

<Concentration, Drying, Etc., of Suspension>

The salt water thickener comprising the ultrafine cellulose fibers can be prepared in various forms such as solid matter, slurry, a dried product, and a concentrate. The composition is dispersed in an aqueous dispersion medium in use and therefore, may be processed so as to easily disperse the composition. The composition is desirably provided in the form of a concentrate or a dried product from the viewpoint of handleability during transport or at the site of work.

The solid concentration of the ultrafine cellulose fibers in the concentrate or the dried product is preferably 6% by mass or larger, more preferably 10% by mass or larger, further preferably 20% by mass or larger, from the viewpoint of handleability.

Examples of the method for concentration or drying include, but are not particularly limited to, a method of adding a concentrating agent to a liquid containing the ultrafine fibers, and a method using a dryer for general use. Also, a method known in the art, for example, a method described in WO2014/024876 (Patent Literature 6), WO2012/107642, and WO2013/121086 can be used.

Examples of the concentrating agent include an acid, an alkali, a salt of a polyvalent metal, a cationic surfactant, an anionic surfactant, a cationic polymer coagulant, an anionic polymer coagulant, and an organic solvent. More specific examples thereof include aluminum sulfate (sulfuric acid band), polyaluminum chloride, calcium chloride, aluminum chloride, magnesium chloride, potassium chloride, calcium sulfate, magnesium sulfate, potassium sulfate, lithium phosphate, potassium phosphate, trisodium phosphate, disodium hydrogen phosphate, inorganic acids (sulfuric acid, hydrochloric acid, nitric acid, phosphoric acid, etc.), organic acids (formic acid, acetic acid, citric acid, malic acid, lactic acid, adipic acid, sebacic acid, stearic acid, maleic acid, succinic acid, tartaric acid, fumaric acid, gluconic acid, etc.), cationic surfactants (quaternary ammonium salts such as alkyl trimethylammonium salt, dialkyl dimethylammonium salt, alkyl dimethylbenzylammonium salt, acylaminoethyl diethylammonium salt, acylaminoethyl diethylamine salt, alkylamide propyl dimethylbenzylammonium salt, alkylpyridinium salt, alkylpyridinium sulfate, stearamide methylpyridinium salt, alkylquinolinium salt, alkylisoquinolinium salt, fatty acid polyethylene polyamide, acylaminoethylpyridinium salt, and acylcolaminoformylmethylpyridinium salt; ester-bonded amines or ether-bonded quaternary ammonium salts such as stearoxymethylpyridinium salt, fatty acid triethanolamine, fatty acid triethanolamine formate, trioxyethylene fatty acid triethanolamine, cetyloxymethylpyridinium salt, and p-isooctylphenoxyethoxyethyl dimethylbenzylammonium salt; heterocyclic amines such as alkylimidazoline, 1-hydroxyethyl-2-alkylimidazoline, 1-acetylaminoethyl-2-alkylimidazoline, and 2-alkyl-4-methyl-4-hydroxymethyl-oxazoline; amine derivatives such as polyoxyethylene alkylamine, N-alkylpropylenediamine, N-alkylpolyethylene polyamine, N-alkylpolyethylene polyamine dimethylsulfate, alkylbiguanide, long-chain amine oxide; etc.), cationic polymer coagulants (copolymers of acrylamide with cationic monomers such as dialkylaminoalkyl (meth)acrylate, dialkylaminoalkyl (meth)acrylamide, or their salts or quaternized compounds, and homopolymers or copolymers of these cationic monomers, etc.), alkalis (lithium hydroxide, sodium hydroxide, potassium hydroxide, calcium hydroxide, lithium carbonate, lithium bicarbonate, potassium carbonate, potassium bicarbonate, sodium carbonate, sodium bicarbonate, calcium carbonate, calcium phosphate, calcium hydrogen phosphate, ammonia, hydrazine, methylamine, ethylamine, diethylamine, triethylamine, propylamine, dipropylamine, butylamine, diaminoethane, diaminopropane, diaminobutane, diaminopentane, diaminohexane, cyclohexylamine, aniline, tetramethylammonium hydroxide, tetraethylammonium hydroxide, tetrapropylammonium hydroxide, tetrabutylammonium hydroxide, benzyltrimethylammonium hydroxide, pyridine, N,N-dimethyl-4-aminopyridine, etc.), anionic surfactants (sodium oleate, potassium oleate, sodium laurate, sodium dodecylbenzenesulfonate, sodium alkylnaphthalenesulfonate, sodium dialkylsulfosuccinate, sodium polyoxyethylene alkyl ether sulfate, sodium polyoxyethylene alkyl allyl ether sulfate, sodium polyoxyethylene dialkyl sulfate, polyoxyethylene alkyl ether phosphoric acid ester, polyoxyethylene alkyl allyl ether phosphoric acid ester, etc.), and anionic polymer coagulants (copolymers of polyacrylic acid, sodium polyacrylate, (meth)acrylic acid, or their alkali metal salts with (meth)acrylamide, hydrolysates of poly(meth) acrylamide, copolymers of vinylsulfonic acids such as acryloylamino-2-methylpropylsulfonic acid, styrenesulfonic acid, vinylsulfonic acid, or their salts, (meth)acrylic acid or its alkali metal salts, and (meth)acrylamide, carboxymethylcellulose, carboxymethyl starch, sodium alginate, etc.).

The organic solvent is not particularly limited and preferably has miscibility with water and more preferably further has polarity. Preferred examples of the organic solvent having polarity include, but are not particularly limited to, alcohols, dioxanes (1,2-dioxane, 1,3-dioxane, and 1,4-dioxane), and tetrahydrofuran (THF). Specific examples of the alcohols include methanol, ethanol, n-propanol, isopropanol, n-butanol, and t-butyl alcohol. Other preferred examples of the organic solvent having polarity include ketones, ethers, dimethyl sulfoxide (DMSO), dimethylformamide (DMF), and dimethylacetamide (DMAc). Examples of the ketones include acetone and methyl ethyl ketone (MEK). Examples of the ethers include diethyl ether and tetrahydrofuran (THF). The organic solvent may be selected in consideration of a solubility parameter value (SP value). It is empirically known that a smaller difference between the SP values of two components means larger solubility. Therefore, an organic solvent having an SP value close to that of water can be selected from the viewpoint of good miscibility with water.

One type of these concentrating agents may be used, or two or more thereof may be used in combination.

Examples of the drying method include a method using a dryer for general use.

In the re-dispersion step, it is desirable that the pH of the suspension should be adjusted to 7 or higher and 14 or lower when the cellulose fibers have no or negative surface charge. It is also desirable that the pH of the suspension should be adjusted to the range of 2 to 7 when the cellulose fibers have positive surface charge.

When the concentrate or the dried product is obtained by the method such as concentration or drying, the concentrate or the dried product can be re-dispersed in a solvent such as water. The viscosity of the aqueous solution containing the ultrafine cellulose fibers thus re-dispersed is an adequate viscosity as compared with the ultrafine cellulose fiber suspension before the concentration or the drying and is also highly stable in the range of 20° C. to 80° C.

[Purpose]

<Purpose as Salt Water Thickener>

The salt water thickener comprising ultrafine cellulose fibers according to the present invention (also simply referred to as the "salt water thickener of the present invention") is capable of variously altering the properties of a fluid by addition to the fluid and as such, can be used for various purposes or for processing of various subjects by exploiting such properties. In the present invention, the term "thickener" refers to an agent suitable for enhancing the viscosity of a fluid when added to the fluid, unless otherwise specified. The "thickener" also includes an agent suitable for enhancing various properties based on a thickening effect, for example, water stopping, dispersion of other components, or water retention. In short, an agent for water stopping, a dispersant, a water retention agent, a friction reducer, a refrigerant, and the like are included in the scope of the thickener according to the present invention.

The salt water thickener of the present invention can be used without particular limitations in a liquid composition (fluid) containing a salt for the general purposes of ultrafine cellulose fibers or cellulose-based materials (cellulose derivatives, crystalline cellulose, and bacterial cellulose) used. Specifically, the salt water thickener of the present invention can be used in subterranean formation processing, cosmetics, food products, drinks, pharmaceutical products, bath agents, paints, chemicals (agricultural chemicals, etc.), or the like, though the purpose is not particularly limited thereto.

Examples of the purpose in relation to subterranean formation processing can include the following purposes:

The composition comprising ultrafine cellulose fibers having a substituent according to the present invention exerts an excellent thickening effect even in a liquid containing a salt and as such, can be used as a thickener in a subterranean formation processing fluid containing seawater in the processing of a subterranean formation of the sea bottom or the like.

The salt water thickener of the present invention comprising ultrafine cellulose fibers can also exert an excellent water stopping property and as such, can be used as a lost circulation material or a dehydration adjuster in a subterranean formation processing fluid.

The salt water thickener of the present invention comprising ultrafine cellulose fibers has thixotropy and can therefore exert the excellent ability to form side walls when used in mud water. The composition of the present invention can facilitate the press filling of cement when used in a cementing fluid. Thus, the composition of the present invention can be used as a side wall-forming agent or a cementing adjuster.

The salt water thickener of the present invention comprising ultrafine cellulose fibers can also exert an emulsification function by capturing oil droplets into the network of the ultrafine fibers in a subterranean formation processing fluid and as such, can be expected to be used as an emulsifier. Specifically, the composition of the present invention can be used for the subterranean formation processing fluid as an emulsion and can be used for stabilizing an emulsion substance contained in the subterranean formation processing fluid. The salt water thickener of the present invention comprising ultrafine cellulose fibers can be used even in an environment of high temperatures, for example, up to 300° C. The ultrafine cellulose fibers have a decomposition temperature of 300° C. and have neither melting point nor glass transition temperature due to high crystallinity. Unlike general resins, the ultrafine cellulose fibers are therefore free from settling. Therefore, the composition of the present invention can be used even in a very deep water well.

The salt water thickener of the present invention comprising ultrafine cellulose fibers can be dispersed in an appropriate dispersion medium for use. The dispersion medium is not particularly limited as long as the dispersion medium can disperse the ultrafine cellulose fibers. Water, an organic solvent, an oil (e.g., light oil, mineral oil, synthetic oil, edible oil, and nonedible oil), or the like can be used.

The ultrafine cellulose fibers contained in the salt water thickener of the present invention can be decomposed using a breaker. The decomposition can control the viscosity or prevent residues in a subterranean formation. Various components that can decompose the cellulose fibers can be used as the breaker. Examples thereof include, but are not limited to, oxidizing agents such as ammonium persulfate and sodium persulfate, acids such as hydrochloric acid and sulfuric acid, and enzymes such as cellulase.

The ultrafine cellulose fibers contained in the salt water thickener of the present invention can be cross-linked with the aim of improving a viscosity effect or the like. Various components that can cross-link the cellulose fibers can be used as the cross-linking agent. Examples thereof include, but are not limited to, borate, potassium hydroxide, nitrate, zirconium, and titanium.

<Fluid>

The fluid according to the present invention is a composition containing water and refers to a composition lacking a given shape, unless otherwise specified. The fluid can also be referred to as a liquid composition. The fluid can be, for example, a composition for subterranean formation processing, a cosmetic composition, a food composition, a drink composition, or a pharmaceutical composition.

In the case of using a fluid containing the salt water thickener comprising ultrafine cellulose fibers according to the present invention, the content is not particularly limited as long as the intended effect is exerted. Typically, the fluid can contain 0.005 to 10% by mass, preferably 0.01 to 5% by mass, of the cellulose fibers in terms of a solid concentration (as the total amount of the cellulose fibers). In the case of using the fluid for subterranean formation processing, the solid concentration of the cellulose fibers in the fluid is 0.05 to 2% by mass from the viewpoint that a water stopping property can be sufficiently exerted even at a high temperature.

(Fluid for Subterranean Formation Processing)

The salt water thickener of the present invention can be used, as mentioned above, for thickening, lost circulation, dehydration adjustment, emulsification, wall formation, or cementing adjustment. Also, the salt water thickener of the present invention is resistant to salt and as such, can be added, for use, to various fluids for use in subterranean formation processing, for example, well drilling. Such a fluid includes, for example, a fracturing fluid, mud water, a cementing fluid, a well control fluid, a well kill fluid, an acid fracturing fluid, an acid diverting fluid, a stimulation fluid, a sand control fluid, a completion fluid, a wellbore consolidation fluid, a remediation treatment fluid, a spacer fluid, a drilling fluid, a frac-packing fluid, a water conformance fluid, and a gravel packing fluid.

(Other Components in Fluid)

The fluid provided by the present invention may contain various components that are added to conventional fluids for subterranean formation processing, in addition to the salt water thickener of the present invention comprising ultrafine cellulose fibers. Examples of the components to be added can include, but are not limited to, weighting materials, viscosity adjusters, dispersants, coagulants, lost circulation materials, dehydration adjusters, pH adjusters, friction reducers, hygroscopic expansion controlling agents, emulsifiers, surfactants, biocides, antifoaming agents, scale preventives, corrosion inhibitors, temperature stabilizers, resin coating agents, crack support materials, salts, and proppants. Only one of these components may be added, or two or more thereof may be added.

The weighting material is used for enhancing the specific gravity of the fluid, stabilizing bare side walls, and preventing burst of gas, water, or the like. A mineral such as barite or hematite can be used as the weighting material, though the weighting material is not limited thereto.

The viscosity adjuster is also called gelling agent, thickener, or mud conditioning agent and is used for optimizing the viscosity of the fluid. In addition to minerals such as bentonite, attapulgite, sepiolite, and synthetic smectite, water-soluble natural and synthetic polymers are used as components therefor. One preferred example of the water-soluble polymer includes a polymer derived from a natural polysaccharide. Specific examples of the viscosity adjuster include, but are not limited to, natural products or natural product-derived ones such as guar gum and guar gum derivatives, water-soluble cellulose derivatives such as methylcellulose, ethylcellulose, hydroxyethylcellulose, hydroxypropylmethylcellulose, hydroxyethylmethylcellulose, glyoxal-added hydroxypropylmethylcellulose, carboxymethylcellulose, and carboxyethylcellulose, gum arabic, alginic acid and its esters, alginate, elemi resin, ghatti gum, carrageenan, karaya gum, carob bean gum, thickening polysaccharides, tamarind gum, tragacanth gum, starch glycolate, starch acid salts, furcellaran, glucose, glucose polysaccharides, sucrose, and xanthan gum. Examples of the synthetic polymer include, but are not limited to, partially hydrolyzed polyacrylamide (PHPA polymer), polyvinyl alcohol, and polyacrylate polymers.

The lost circulation material is used for preventing the runoff of the subterranean formation processing fluid. Sawdust, straw, cellophane, cement, pulp fibers, polylactic acid, polyglycolic acid, polyarylate, or the like can be used as the lost circulation material, though the lost circulation material is not limited thereto.

The dehydration adjuster is used for decreasing dehydration and strengthening the protection of side walls. A sulfonated asphalt derivative, a starch derivative, polyarylate, a polyanionic cellulose polymer, or the like is used as the dehydration adjuster, though the dehydration adjuster is not limited thereto.

The emulsifier is used for dispersing, in one liquid, the other liquid that is usually less miscible therewith. Examples of the emulsifier include, but are not limited to, glycerin ester, saponin, sucrose fatty acid ester, lecithin, polyethylene glycol, polyoxyethylene cetyl ether, polyoxyethylene oleyl ether, polyoxyethylene stearyl ether, polyoxyethylene lauryl ether, polyoxyethylene octyl dodecyl ether, polyoxyethylene decyl tetradecyl ether, polyoxyethylene behenyl ether, ethyl caprate, cetyl palmitate, stearyl stearate, cetyl octanoate, hexyldecyl isostearate, octyl isononanoate, dodecyl isononanoate, glycerin stearate, glycerin palmitate, glycerin tri(caprylate-caprate), sorbitan monostearate, sorbitan oleate, propylene glycol stearate, propylene glycol oleate, propylene glycol laurate, glycol stearate, glycol dioleate, polyethylene glycol monostearate, polyoxyethylene glycol isostearate, polyoxyethylene hydrogenated castor oil laurate, polyoxyethylene hydrogenated castor oil, polyoxyethylene sorbitan fatty acid ester, and dimethicone copolyol.

The proppant is solid matter of approximately 0.5 mm and is used for being pushed in, for example, a fracturing crack and supporting the crack so as not to close the crack. Examples of the proppant include, but are not limited to, sand, glass beads, ceramic particles, and resin-coated sand.

(Mud Water)

As a fluid, a preferred embodiment provides mud water for use in well drilling, comprising the salt water thickener of the present invention comprising ultrafine cellulose fibers. The content of the cellulose fibers in the mud water is not particularly limited as long as the intended effect is exerted. The mud water contains, for example, 0.004 to 40% by mass, preferably 0.04 to 4% by mass, more preferably 0.08 to 2% by mass, of the cellulose fibers in terms of the solid concentration (as the total amount of the cellulose fibers).

The mud water for use in well drilling is generally used for removing cuttings from a bottom hole and transporting the cuttings aboveground. The mud water also has roles in preventing the unintended flow of the fluid into a well or gushing of the fluid to above ground by controlling the internal pressure of the well, preventing the collapse of a subterranean formation by protecting side walls, and cooling an instrument in a well by decreasing the friction between a drill string and side walls. The mud water also has a role in providing information on the underground by transporting cuttings or gas. The mud water includes bentonite mud, lignosulfonate mud, KCl polymer mud, oil-based mud, and the like. The present embodiment provides various mud waters.

In general, the bentonite mud is inexpensive and easily handled, but is vulnerable to salts or cement and is easily gelled. In order to compensate for these disadvantages, carboxymethylcellulose or the like has heretofore been added thereto in some cases. The present invention can provide bentonite mud having higher performance.

The present embodiment provides disperse mud water comprising the salt water thickener of the present invention comprising ultrafine cellulose fibers. Such mud water can contain conventional lignosulfonate (also referred to as ligninsulfonic acid) as a dispersant, lignite humic acid derivative), a pH adjuster (e.g., sodium hydroxide), and a weighting material. The disperse mud water provided by the present embodiment can be expected to be further enhanced in terms of a mudstone-protecting function, easy control of viscosity or specific gravity, and resistance to temperatures (reportedly, the general operating temperature of lignosulfonate mud is approximately 175° C. and the general operating temperature of lignite mud is approximately 190° C.), salts, cement, etc., as compared with conventional lignosulfonate mud.

The mud water provided by the present embodiment can also be constituted as KCl mud. K ions are known to be very excellent in the effect of suppressing the swelling or dispersion of clay. On the other hand, K ions have too strong power of aggregation and as such, have heretofore been used in combination with xanthan gum or a partially hydrolyzed polyacrylamide (PHPA) polymer, which can exert a thickening property or a protective colloidal property even in a liquid containing a large amount of K ions. In the present embodiment, the salt water thickener comprising ultrafine cellulose fibers provided by the present invention can be used together with xanthan gum or PHPA or instead thereof. The KCl mud provided by the present embodiment can be expected to be further enhanced in terms of a mudstone-protecting function, easy control of viscosity or specific gravity, and resistance to salts, cement, etc., as compared with conventional KCl-polymer mud.

The mud water provided by the present embodiment can also be constituted as oil-based mud. The oil-based mud contains oil mud having an oil content of 95% or more, and invert emulsion oil mud which is a water-oil-in emulsion prepared using 15 to 35% of water and an emulsifier. The oil-based mud generally has advantages such as the suppression of hydration or swelling of a mudstone layer, high-temperature stability, lubricity, the prevention of productivity from being damaged by the invasion of water into an oil layer, low likelihood to corrode metals, and little deterioration attributed to putrefaction, as compared with water-based mud. The present embodiment can be expected to provide oil-based mud that exploits these properties while further improving them.

(Fracturing Fluid)

A preferred embodiment provides a fracturing fluid for use in hydraulic fracturing, comprising the salt water thickener of the present invention comprising ultrafine cellulose fibers. The content of the cellulose fibers in the fracturing fluid is not particularly limited as long as the intended effect is exerted. The fracturing fluid contains, for example, 0.002 to 20% by mass, preferably 0.02 to 2% by mass, more preferably 0.04 to 1% by mass, of the cellulose fibers in terms of the solid concentration (as the total amount of the cellulose fibers).

The fracturing fluid generally contains approximately 90 to 95% by mass of water or an organic solvent as a solvent or a dispersion medium and contains approximately 5 to 9% by mass of a proppant (support). The fracturing fluid optionally further contains approximately 0.5 to 1% by mass of various additives such as a gelling agent, a scale preventive, an acid for dissolving rocks, etc., and a friction reducer. These components and additives can also be contained in the same ranges as above in the fracturing fluid provided by the present embodiment.

The ultrafine cellulose fibers in the fracturing fluid can perform the stable dispersion of the proppant as well as flexible viscosity control by further improvement in viscosity through cross-linking reaction and by reduction in the viscosity of the fluid caused by decomposition after use. Also, the ultrafine cellulose fibers can also be used as a degradable lost circulation material in the fracturing fluid. The ultrafine cellulose fibers can form better cracks because the internal pressure of well is easily applied by preventing lost circulation. The addition of a conventional lost circulation material to the fracturing fluid might clog the output passage of gas. By contrast, the lost circulation material consisting of the ultrafine cellulose fibers does not clog the output passage by decomposition after use.

(Cementing Fluid)

A preferred embodiment provides a cementing fluid comprising the salt water thickener of the present invention comprising ultrafine cellulose fibers. The content of the cellulose fibers in the cementing fluid is not particularly limited as long as the intended effect is exerted. The cementing fluid contains, for example, 0.001 to 40% by mass, preferably 0.01 to 20% by mass, more preferably 0.05 to 5% by mass, of the cellulose fibers in terms of the solid concentration (as the total amount of the cellulose fibers).

General cement such as tricalcium silicate or high temperature-resistant cement such as class G cement for use in high-temperature wells can be used in the cementing fluid. A cementing agent such as a cement accelerator or a cement retarder can be used as an additive for the optimization of cementing time. Also, a cement dispersant, a fluidity-improving agent, a low-specific gravity or low-dehydration cement additive, or the like can be used. In addition, for example, a dehydration adjuster, a strength stabilizer, a weighting material, a cement spacer additive for improvement in substitution efficiency or mine washing, a chemical wash additive for side wall washing, a cement slurry antifoaming agent, a scale preventive, a lost circulation material, calcium aluminate, sodium polyphosphate, a fly ash, a foaming agent, a foam stabilizer, and gas in an amount sufficient for forming foams may be added thereto. The cementing fluid may contain inert particles of crushed rubber, if necessary, for imparting elasticity to its cured matter.

The ultrafine cellulose fibers form a three-dimensional network in water and can stably disperse even ultrafine substances. For example, 10 μm or smaller cement particles exist in the cementing fluid. The ultrafine cellulose fibers can stably disperse even 10 μm or smaller particles. The ultrafine cellulose fibers can also stably disperse hydrophobic particles into water and can also stably disperse, for example, hydrophobized pigment particles or minerals. The ultrafine cellulose fibers are highly hydrophilic and can therefore suppress the water separation of the cementing fluid. The ultrafine cellulose fibers are also highly resistant to salts and are therefore highly compatible with the cementing fluid rich in calcium.

For a high-temperature well, such as a geothermal well, which contains carbon dioxide, a cementing fluid that is not deteriorated in the presence of carbon dioxide containing salt water is desirable. A cement composition for use in geothermal wells or similar wells is preferably lightweight with a density in the range of, for example, approximately 9.5 to approximately 14 pounds/gallon (approximately 1.14 to approximately 1.68 g/cm3). The cementing fluid provided by the present embodiment can also be constituted to have a density in such a range.

(Cosmetic Composition)

The salt water thickener of the present invention can be used, as mentioned above, for thickening, stabilization of dispersion of other components, or water retention. Also, the salt water thickener of the present invention is resistant to salt and as such, can be added, for use, to a cosmetic composition in the form of a liquid containing a salt. In a preferred embodiment, the fluid is a cosmetic composition. The cosmetic composition may be for makeup or may be for skincare or for hair or scalp. The specific form of the cosmetic composition is not particularly limited and can be a solution, an emulsion, a suspension, a cream an aerosol, or the like. The cosmetic composition may also contain various components acceptable for cosmetics, in addition to the salt water thickener of the present invention. Examples of such components include functional components such as surfactants, pH adjusters, chelating agents, antioxidants, fragrances, dyes, pigments, powders, emulsifiers, preservatives, plant extracts, ultraviolet absorbers, and whitening agents. More specific examples of the components include purified water, polyethylene glycol, propylene glycol, ethanol, glycerin, EDTA salt, citrate, vitamin C or vitamin C derivatives, and vitamin E.

(Method for Producing Fluid)

The present invention also provides a method for producing a fluid, comprising the following steps;
mixing ultrafine cellulose fibers, a water-soluble polymer, and water to obtain a mixture; and adding a salt to the obtained mixture.

In this context, the salt may be mixed in the state of a composition. It is described in the production method of the present invention. As mentioned above, according to the studies of the present inventors, when a salt is added to the ultrafine cellulose fibers obtained as a cellulose suspension having a relatively low concentration of 6% by mass or lower without mixing the ultrafine cellulose fibers with the water-soluble polymer in advance, the ultrafine cellulose fibers are not stably dispersed due to gelation. On the other hand, the ultrafine cellulose fibers are stably dispersed by mixing the cellulose suspension with a solution of the water-soluble polymer in advance, even if a salt is added. Therefore, the method for producing a fluid according to the present invention preferably comprises the steps described above in the order described above.

[Method for Processing Subterranean Formation and Method for Producing Petroleum Resource]

The present invention also provides a method for processing a subterranean formation using the salt water thickener of the present invention or the fluid mentioned above. The subterranean formation (also called stratum) also includes a subterranean formation of the sea bottom.

The subterranean formation processing includes well drilling that is used for various purposes. Examples of the well includes, but are not limited to, an exploratory well or a wildcat, an appraisal well, an exploratory well or an exploration well, a delineation well, a development well, a production well, an injection well, an observation well, and a service well.

Also, the subterranean formation processing includes the following:

Cementing: This is mainly performed for filling cement to the gaps between a casing and side walls after well drilling to fix the casing.

Borehole survey or well logging: This includes mud logging. The mud logging involves observing and analyzing gas or cuttings in circulated drilling mud. As a result, oil and gas layers can be detected early, and lithofacies in drilling can be determined.

Recovery of petroleum resources: This includes water flooding and chemical flooding.

Well stimulation: This is performed for the purpose of, for example, improving the nature of side walls or a reservoir near a well, and improving productivity. This includes acidizing which performs washing using hydrochloric acid or the like, and hydraulic fracturing, hydrofracturing, or fracking which secures a fluid passage by making cracks in a reservoir. For production from a sand sheet, this operation includes, for example, sand control for preventing the flow of sand into a well or damage on tubing or equipment by a fluid containing sand, and plastic consolidation which compresses sandstones by the press filling of a fluid containing a resin to a subterranean formation.

Well completion using water-based mud, oil-based mud, a chemical fluid, or a brine.

Fracturing using a high-pressure fracturing fluid for forming a passage (crack or fracture) in a tight subterranean formation having a low permeability.

Well workover.

Well abandonment.

The present invention also provides a method for producing a petroleum resource using the salt water thickener or the fluid obtained by the present invention. The petroleum resource refers to every mineral hydrocarbon including solid, liquid, and gas, present in the underground. Typical examples of the petroleum resource include petroleum (oil) in a liquid form and natural gas in a gaseous form, which are general categories. The petroleum resource also includes conventional petroleum (oil) and natural gas as well as tight sand gas, shale oil, tight oil, heavy oil, extra heavy oil, shale gas, single-layer gas, bitumen, heavy fuel oil, oil sand, oil shale, and methane hydrate.

EXAMPLES

Hereinafter, the present invention will be described with reference to Examples. However, the scope of the present invention is not intended to be limited by Examples.

Production Example 1

Preparation of Ultrafine Cellulose Fibers—1

100 g of urea, 55.3 g of sodium dihydrogen phosphate dihydrate, and 41.3 g of disodium hydrogen phosphate were dissolved in 109 g of water to prepare a phosphorylation reagent.

A sheet obtained by paper making from dried needle bleached kraft pulp was treated with a cutter mill and a pin mill to prepare cotton-like fibers. 100 g (absolute dry mass) of the cotton-like fibers was separated, and the phosphorylation reagent was evenly sprayed thereto. Then, the fibers were kneaded by hand to obtain chemical-impregnated pulp.

The obtained chemical-impregnated pulp was heat-treated for 80 minutes in an air-blow dryer with a damper heated to 140° C. to obtain phosphorylated pulp.

100 g (pulp mass) of the obtained phosphorylated pulp was separated, and 10 L of ion-exchange water was poured to the pulp, which was then uniformly dispersed by stirring, followed by filtration and dehydration to obtain a dehydrated sheet. This step was repeated twice. Subsequently, the obtained dehydrated sheet was diluted with 10 L of ion-exchange water, and a 1 N aqueous sodium hydroxide solution was added thereto in small portions with stirring to obtain pulp slurry having a pH of 12 to 13. Then, this pulp slurry was dehydrated to obtain a dehydrated sheet. Then, 10 L of ion-exchange water was added thereto. The pulp was then uniformly dispersed by stirring, followed by filtration and dehydration to obtain a dehydrated sheet. This step was repeated twice. The infrared absorption spectra of the obtained dehydrated sheet were measured by FT-IR. As a result, absorption based on a phosphoric acid-derived group was observed at 1230 to 1290 cm$^{-1}$ to confirm the addition of the phosphoric acid-derived group. Accordingly, in the obtained dehydrated sheet (phosphorus oxoacid-introduced cellulose), a portion of the hydroxy groups of cellulose was substituted by a functional group of the structural formula (1) given below. In the formula, each of a, b, m, and n is a natural number (provided that a=b×m). At least one of $\alpha^1$, $\alpha^2$, ..., $\alpha^n$, and $\alpha'$ is O$^-$, and the remaining moieties are any of R and OR. Each R is any of a hydrogen atom, a saturated linear hydrocarbon group, a saturated branched hydrocarbon group, a saturated cyclic hydrocarbon group, an unsaturated linear hydrocarbon group, an unsaturated branched hydrocarbon group, an aromatic group, and groups derived therefrom. β is a monovalent or higher valent cation consisting of organic matter or inorganic matter.

[Formula 1]

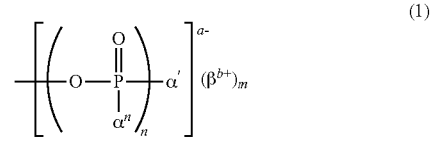

Ion-exchange water was added to the obtained phosphorylated cellulose to prepare slurry having a cellulose concentration of 1.75% by mass. This slurry was subjected to defibration treatment for 180 minutes under a condition of 6900 rpm using a defibration treatment apparatus (manufactured by M Technique Co., Ltd., Clearmix-11S) to obtain a cellulose suspension. The cellulose maintained cellulose type I crystals in X-ray diffraction. This cellulose suspension was further passed through a wet atomization apparatus ("ULTIMAIZER" manufactured by Sugino Machine Ltd.) 10 times at a pressure of 245 MPa to obtain cellulose fibers 1. The cellulose maintained cellulose type I crystals in X-ray diffraction. The microscope observation photograph and the transmission electron microscope photograph are shown. There existed coarse fibers having a fiber width of 10 µm or larger and ultrafine fibers having a fiber width of 1000 nm or smaller (FIG. 1).

Production Example 2

Cellulose fibers 2 were obtained in the same way as in Production Example 1 except that the cellulose suspension was passed through a wet atomization apparatus ("ULTIMAIZER" manufactured by Sugino Machine Ltd.) once at a pressure of 245 MPa. The cellulose maintained cellulose type I crystals in X-ray diffraction. The microscope observation photograph and the transmission electron microscope photograph are shown. Coarse fibers having a fiber width of 10 µm or larger were not observed, while ultrafine fibers having a fiber width of 1000 nm or smaller were present (FIG. 2).

Production Example 3

Cellulose fibers 3 were obtained in the same way as in Production Example 1 except that the amounts of disodium hydrogen phosphate dihydrate and disodium hydrogen phosphate were changed to 5.5 g and 4.1 g, respectively. The cellulose maintained cellulose type I crystals in X-ray diffraction.

The amount of the phosphoric acid-derived group introduced (amount of the substituent) was measured by the following method:

[Measurement of Amount of Phosphoric Acid-Derived Group Introduced]

The difference between the amounts of the phosphoric acid-derived group-derived strongly acidic group and weakly acidic group introduced serves as a measure of the condensation of the phosphoric acid-derived group. A smaller value of this difference confers more highly transparent slurry containing the ultrafine cellulose fibers with lower condensation of the phosphoric acid-derived group. The amounts of the phosphoric acid-derived group-derived strongly acidic group and weakly acidic group introduced were measured by directly diluting the slurry containing the ultrafine cellulose fibers after the defibration treatment with ion-exchange water to have a solid concentration of 0.2% by mass, followed by treatment with an ion-exchange resin and titration using an alkali. In the treatment with an ion-exchange resin, a strongly acidic ion-exchange resin (Amberjet 1024; Organo Corp.; conditioning agent) was added at a volume ratio of 1/10 to the slurry containing 0.2% by mass of ultrafine cellulose fibers, followed by shake treatment for 1 hour. Then, the suspension was poured to a mesh having an opening of 90 µm so that the slurry was separated from the resin. In the titration using an alkali, a 0.1 N aqueous sodium hydroxide solution was added to the slurry containing the ultrafine cellulose fibers after the ion exchange, which change in the value of electrical conductivity exhibited by the slurry was measured.

Specifically, the amount of the alkali (mmol) required for the first region in the curve shown in FIG. 3 was divided by the solid content (g) in the slurry to be titrated to determine the amount of the strongly acidic group introduced (mmol/g). Also, the amount of the alkali (mmol) required for the second region in the curve shown in FIG. 1 was divided by the solid content (g) in the slurry to be titrated to determine the amount of the weakly acidic group introduced (mmol/g).

Preparation of Ultrafine Cellulose Fibers—2

200 g (dry mass) of undried needle bleached kraft pulp, 2.5 g of TEMPO, and 25 g of sodium bromide were dispersed in 1500 ml of water. Then, an aqueous solution containing 13% by mass of sodium hypochlorite was added thereto such that the amount of sodium hypochlorite was 5.0 mmol with respect to 1.0 g of the pulp to start reaction. During the reaction, the pH was kept at 10 to 11 by the dropwise addition of a 0.5 M aqueous sodium hydroxide solution. The reaction was terminated when no change in pH was found.

Then, this pulp slurry was dehydrated to obtain a dehydrated sheet. Then, 10 L of ion-exchange water was added thereto. Next, the pulp was uniformly dispersed by stirring, followed by filtration and dehydration to obtain a dehydrated sheet. This step was repeated twice. The infrared absorption spectra of the obtained dehydrated sheet were measured by FT-IR. As a result, absorption based on a carboxylic acid-derived group was observed at 1730 cm-1 to confirm the addition of the carboxylic acid-derived group. This dehydrated sheet (TEMPO-oxidized cellulose) was used to prepare ultrafine cellulose fibers.

Production Example 4

Ion-exchange water was added to the thus-obtained TEMPO-oxidized cellulose having the added carboxylic acid-derived group to prepare slurry having a cellulose concentration of 1.75% by mass. This slurry was subjected to defibration treatment for 180 minutes under a condition of 6900 rpm using a defibration treatment apparatus (manufactured by M Technique Co., Ltd., Clearmix-11S) to obtain a cellulose suspension. The cellulose maintained cellulose type I crystals in X-ray diffraction. This cellulose suspension was further passed through a wet atomization apparatus ("ULTIMAIZER" manufactured by Sugino Machine Ltd.) 10 times at a pressure of 245 MPa to obtain cellulose fibers 4. The cellulose maintained cellulose type I crystals in X-ray diffraction.

The viscosities of the cellulose fibers 1 to 4 were measured by the following method:

Water was added to the cellulose fibers 1 to 4 to adjust their respective cellulose fiber concentration to 0.4% by mass. The suspensions of the ultrafine celluloses 1 to 4 were left for 24 hours. Then, their viscosities were measured at 25° C. at 3 rpm (3 min) using a type B viscometer (manufactured by Brookfield Engineering, analog viscometer T-LVT). The results are shown in Table 1.

TABLE 1

| | | Concentration (%) | Type of substituent | Amount of substituent (mmol/g) | Viscosity (mPa · S) |
|---|---|---|---|---|---|
| Production Example 1 | Cellulose fibers 1 | 0.4 | Phosphoric acid-derived group | 0.71 | 2970 |

TABLE 1-continued

|  |  | Concentration (%) | Type of substituent | Amount of substituent (mmol/g) | Viscosity (mPa·S) |
|---|---|---|---|---|---|
| Production Example 2 | Cellulose fibers 2 | 0.4 | Phosphoric acid-derived group | 0.71 | 14820 |
| Production Example 3 | Cellulose fibers 3 | 0.4 | Phosphoric acid-derived group | 0.09 | 770 |
| Production Example 4 | Cellulose fibers 4 | 0.4 | Carboxylic acid-derived group | 1.2 | 2540 |

From Table 1, the following was observed.

The suspensions of the ultrafine celluloses 1 and 2 having an amount of a phosphoric acid-derived group of 0.71 mmol/g had an adequate viscosity.

The ultrafine cellulose fibers 2 having a lower degree of defibration offered a higher viscosity.

In Production Example 3, the phosphorylation reaction was not sufficient, and only coarse fibers having a fiber width of 10 μm or larger were observed even after defibration, while ultrafine fibers having a fiber width of 1.000 nm or smaller were hardly found. Thus, no adequate viscosity was exerted.

<Re-Dispersion of Concentrate Prepared by Addition of Polar Organic Solvent in Salt Water>

The cellulose fibers used were the cellulose fibers 1 produced in Production Example 1 unless otherwise specified. Hereinafter, a liquid containing cellulose fibers suspended in a solvent (water, etc.) is referred to as a "cellulose fiber suspension".

Reference Example 1

Water was added to the cellulose fibers 1 to adjust the cellulose fiber concentration to 0.4% by mass. 160 g of isopropyl alcohol (IPA) was added to 80 g of this cellulose fiber suspension having a cellulose fiber concentration of 0.4% by mass, and the mixture was stirred at 1000 rpm and concentrated to 1.6 g by filtration and compression. This concentrate was crushed in a mixer to prepare a powder. 80 g of a re-dispersing solution (water) was added to this powder, and the mixture was stirred at 8000 rpm for 3 minutes, followed by viscosity measurement.

Reference Example 2

The same method as in Reference Example 1 was carried out except that the cellulose fibers 2 were used instead of the cellulose fibers 1.

Reference Example 3

The same method as in Reference Example 1 was carried out except that the cellulose fibers 4 were used instead of the cellulose fibers 1.

Reference Example 4

The same method as in Reference Example 1 was carried out except that 80 g of an aqueous solution containing 0.4% by mass of xanthan gum (manufactured by Tokyo Chemical Industry Co., Ltd.) was used instead of the cellulose fiber suspension. Xanthan gum is abbreviated to "XG".

Reference Example 5

The same method as in Reference Example 1 was carried out except that 80 g of an aqueous solution containing 0.4% by mass of carboxymethylcellulose (manufactured by Telnite Co., Ltd., Terpolymer II) was used instead of the cellulose fiber suspension. Carboxymethylcellulose is abbreviated to "CMC".

Reference Example 6

The same method as in Reference Example 1 was carried out except that 80 g of 1.2% by mass of a polycarboxylic acid-type anionic surfactant (San Nopco Ltd., SN Dispersant 5040, molecular weight: 50,000) was used instead of the cellulose fiber suspension. The polycarboxylic acid-type anionic surfactant is abbreviated to "PC".

Reference Example 7

Water was added to the cellulose fibers 1 to adjust the cellulose fiber concentration to 0.8% by mass. 40 g of the cellulose fiber suspension having a cellulose fiber concentration of 0.8% by mass and 40 g of an aqueous solution containing 0.8% by mass of xanthan gum were mixed and stirred at 2000 rpm. 160 g of IPA was further added thereto, and the mixture was stirred at 1000 rpm and concentrated to 1.6 g by filtration and compression. This concentrate was crushed in a mixer to prepare a powder. 80 g of a re-dispersing solution (water) was added to this powder, and the mixture was stirred at 8000 rpm for 3 minutes, followed by viscosity measurement.

Reference Example 8

The same method as in Reference Example 7 was carried out except that the cellulose fibers 2 produced in Production Example 2 were used.

Reference Example 9

The same method as in Reference Example 7 was carried out except that the cellulose fibers 4 produced in Production Example 4 were used.

Reference Example 10

The same method as in Reference Example 7 was carried out except that an aqueous carboxymethylcellulose solution was used instead of the aqueous xanthan gum solution.

Reference Example 11

The same method as in Reference Example 7 was carried out except that 2.4% by mass of a polycarboxylic acid-type anionic surfactant was used instead of the aqueous solution containing 0.8% by mass of xanthan gum.

Example 1

The same method as in Reference Example 7 was carried out except that 80 g of an aqueous solution containing 1% by mass of sodium chloride, which was adjusted to pH 10 by the addition of NaOH, was used as the re-dispersing solution.

Example 2

The same method as in Example 1 was carried out except that the cellulose fibers 2 produced in Production Example 2 were used.

Example 3

The same method as in Example 1 was carried out except that the cellulose fibers 4 produced in Production Example 4 were used.

Example 4

The same method as in Reference Example 7 was carried out except that 80 g of an aqueous solution containing 25% by mass of sodium chloride, which was adjusted to pH 10 by the addition of NaOH, was used as the re-dispersing solution.

Example 5

The same method as in Reference Example 7 was carried out except that 80 g of an aqueous solution containing 2% by mass of potassium chloride, which was adjusted to pH 10 by the addition of NaOH, was used as the re-dispersing solution.

Example 6

The same method as in Reference Example 7 was carried out except that 80 g of an aqueous solution containing 0.1% by mass of calcium chloride, which was adjusted to pH 9 by the addition of NaOH, was used as the re-dispersing solution.

Example 7

The same method as in Reference Example 7 was carried out except that 80 g of an aqueous solution containing 2% by mass of calcium chloride, which was adjusted to pH 9 by the addition of NaOH, was used as the re-dispersing solution.

Example 8

The same method as in Example 1 was carried out except that carboxymethylcellulose was used instead of xanthan gum.

Example 9

The same method as in Example 4 was carried out except that carboxymethylcellulose was used instead of xanthan gum.

Example 10

The same method as in Example 1 was carried out except that 2.4% by mass of a polycarboxylic acid-type anionic surfactant was used instead of the aqueous solution containing 0.8% by mass of xanthan gum.

Example 11

The same method as in Example 4 was carried out except that 2.4% by mass of a polycarboxylic acid-type anionic surfactant was used instead of the aqueous solution containing 0.8% by mass of xanthan gum.

Comparative Example 1

The same method as in Reference Example 1 was carried out except that 80 g of an aqueous solution containing 1% by mass of sodium chloride, which was adjusted to pH 10 by the addition of NaOH, was used as the re-dispersing solution.

Comparative Example 2

The same method as in Reference Example 1 was carried out except that 80 g of an aqueous solution containing 25% by mass of sodium chloride, which was adjusted to pH 10 by the addition of NaOH, was used as the re-dispersing solution.

Comparative Example 3

The same method as in Reference Example 1 was carried out except that 80 g of an aqueous solution containing 2% by mass of potassium chloride, which was adjusted to pH 10 by the addition of NaOH, was used as the re-dispersing solution.

Comparative Example 4

The same method as in Reference Example 1 was carried out except that 80 g of an aqueous solution containing 0.1% by mass of calcium chloride, which was adjusted to pH 10 by the addition of NaOH, was used as the re-dispersing solution.

Comparative Example 5

The same method as in Reference Example 1 was carried out except that 80 g of an aqueous solution containing 2% by mass of calcium chloride, which was adjusted to pH 10 by the addition of NaOH, was used as the re-dispersing solution.

Comparative Example 6

The same method as in Example 1 was carried out except that the cellulose fibers 3 produced in Production Example 3 were used.

Comparative Example 7

80 g of a re-dispersing solution (xanthan gum was dissolved at 0.4% by mass in an aqueous solution containing 1% by mass of sodium chloride, which was adjusted to pH 10 by the addition of NaOH) was added to the cellulose concentrate produced in Reference Example 1, and the mixture was stirred at 8000 rpm for 3 minutes.

The results are shown in Table 2.

TABLE 2

| No. | Cellulose in concentrate Type | Cellulose in concentrate Amount | Additive in concentrate Type | Additive in concentrate Amount | Re-dispersing solution Salt type | Re-dispersing solution Concentration/amount | Concentration after re-dispersion CNF [%] | Concentration after re-dispersion Additive [%] | Concentration after re-dispersion Salt [%] | Appearance | Viscosity [mPa·S] |
|---|---|---|---|---|---|---|---|---|---|---|---|
| Reference Example 1 | Production Example 1 | 0.32 g | — | — | — | 80 g | 0.4% | — | — | Uniform dispersion | 2760 |
| Reference Example 2 | Production Example 2 | 0.32 g | — | — | — | 80 g | 0.4% | — | — | Uniform dispersion | 31360 |
| Reference Example 3 | Production Example 4 | 0.32 g | — | — | — | 80 g | 0.4% | — | — | Uniform dispersion | 2490 |
| Reference Example 4 | — | — | XG | 0.32 g | — | 80 g | — | XG 0.4% | — | Uniform dispersion | 1760 |
| Reference Example 5 | — | — | CMC | 0.32 g | — | 80 g | — | CMC 0.4% | — | Uniform dispersion | 160 |
| Reference Example 6 | — | — | PC | 0.96 g | — | 80 g | — | PC 1.2% | — | Uniform dispersion | 40 |
| Reference Example 7 | Production Example 1 | 0.32 g | XG | 0.32 g | — | 80 g | 0.4% | XG 0.4% | — | Uniform dispersion | 8880 |
| Reference Example 8 | Production Example 2 | 0.32 g | XG | 0.32 g | — | 80 g | 0.4% | XG 0.4% | — | Uniform dispersion | 13960 |
| Reference Example 9 | Production Example 4 | 0.32 g | XG | 0.32 g | — | 80 g | 0.4% | XG 0.4% | — | Uniform dispersion | 7860 |
| Reference Example 10 | Production Example 1 | 0.32 g | CMC | 0.32 g | — | 80 g | 0.4% | CMC 0.4% | — | Uniform dispersion | 18260 |
| Reference Example 11 | Production Example 1 | 0.32 g | PC | 0.96 g | — | 80 g | 0.4% | PC 1.2% | — | Uniform dispersion | 4280 |
| Example 1 | Production Example 1 | 0.32 g | XG | 0.32 g | NaCl | 1% 80 g | 0.4% | XG 0.4% | NaCl 1% | Uniform dispersion | 11480 |
| Example 2 | Production Example 2 | 0.32 g | XG | 0.32 g | NaCl | 1% 80 g | 0.4% | XG 0.4% | NaCl 1% | Uniform dispersion | 13110 |
| Example 3 | Production Example 4 | 0.32 g | XG | 0.32 g | NaCl | 1% 80 g | 0.4% | XG 0.4% | NaCl 1% | Uniform dispersion | 8420 |
| Example 4 | Production Example 1 | 0.32 g | XG | 0.32 g | NaCl | 25% 80 g | 0.4% | XG 0.4% | NaCl 25% | Uniform dispersion | 11060 |
| Example 5 | Production Example 1 | 0.32 g | XG | 0.32 g | KCl | 2% 80 g | 0.4% | XG 0.4% | KCl 2% | Uniform dispersion | 10840 |
| Example 6 | Production Example 1 | 0.32 g | XG | 0.32 g | $CaCl_2$ | 0.1% 80 g | 0.4% | XG 0.4% | $CaCl_2$ 0.1% | Uniform dispersion | 9760 |
| Example 7 | Production Example 1 | 0.32 g | XG | 0.32 g | $CaCl_2$ | 2% 80 g | 0.4% | XG 0.4% | $CaCl_2$ 2% | Uniform dispersion | 4100 |
| Example 8 | Production Example 1 | 0.32 g | CMC | 0.32 g | NaCl | 1% 80 g | 0.4% | CMC 0.4% | NaCl 1% | Uniform dispersion | 12080 |
| Example 9 | Production Example 1 | 0.32 g | CMC | 0.32 g | KCl | 2% 80 g | 0.4% | CMC 0.4% | KCl 2% | Uniform dispersion | 11340 |
| Example 10 | Production Example 1 | 0.32 g | PC | 0.96 g | NaCl | 1% 80 g | 0.4% | PC 1.2% | NaCl 1% | Uniform dispersion | 3680 |
| Example 11 | Production Example 1 | 0.32 g | PC | 0.96 g | KCl | 2% 80 g | 0.4% | PC 1.2% | KCl 2% | Uniform dispersion | 3230 |
| Comparative Example 1 | Production Example 1 | 0.32 g | — | — | NaCl | 1% 80 g | 0.4% | — | NaCl 1% | Precipitates | Immeasurable |
| Comparative Example 2 | Production Example 1 | 0.32 g | — | — | NaCl | 25% 80 g | 0.4% | — | NaCl 25% | Precipitates | Immeasurable |
| Comparative Example 3 | Production Example 1 | 0.32 g | — | — | KCl | 2% 80 g | 0.4% | — | KCl 2% | Precipitates | Immeasurable |
| Comparative Example 4 | Production Example 1 | 0.32 g | — | — | $CaCl_2$ | 0.1% 80 g | 0.4% | — | $CaCl_2$ 0.1% | Precipitates | Immeasurable |
| Comparative Example 5 | Production Example 1 | 0.32 g | — | — | $CaCl_2$ | 2% 80 g | 0.4% | — | $CaCl_2$ 2% | Precipitates | Immeasurable |
| Comparative Example 6 | Production Example 3 | 0.32 g | XG | 0.32 g | NaCl | 1% 80 g | 0.4% | XG 0.4% | NaCl 1% | Uniform dispersion | 2080 |
| Comparative Example 7 | Production Example 1 | 0.32 g | — | — | NaCl XG | 1% 80 g 0.4% | 0.4% | XG 0.4% | NaCl 1% | Non-uniform | Immeasurable |

From Table 2, the following was confirmed.

The concentrate obtained by concentration after mixing of the cellulose fibers with the water-soluble polymer can be uniformly dispersed in salt water (Examples 1 to 11).

The concentrate obtained by the concentration of the cellulose fibers alone without being mixed with the water-soluble polymer is not dispersed in salt water, resulting in precipitates (Comparative Examples 1 to 5).

In the case of insufficient phosphorylation reaction and insufficient cellulose fiber nanosizing, adequate viscosity is not exerted (Comparative Example 6).

Even if the concentrate of the cellulose fibers alone is re-dispersed in salt water containing the water-soluble polymer, the cellulose fibers are not uniformly dispersed with their grains remaining (Comparative Example 7). It is preferred to mix the cellulose fibers with the water-soluble polymer before concentration.

<Re-Dispersion of Concentrate Prepared by Addition of Salt of Polyvalent Metal in Salt Water>

The cellulose fibers used were the cellulose fibers 1 produced in Production Example 1 unless otherwise specified.

Reference Example 12

Water was added to the cellulose fibers 1 to adjust the cellulose fiber concentration to 0.4% by mass. 0.8 g of aluminum chloride hexahydrate was added to 80 g of this cellulose fiber suspension having a cellulose fiber concentration of 0.4% by mass, and the mixture was stirred at 1000 rpm and concentrated to 1.6 g by filtration and compression. This concentrate was crushed in a mixer to prepare a powder. 80 g of a re-dispersing solution (water adjusted to pH 12.5 by the addition of sodium hydroxide) was added to this powder, and the mixture was stirred at 8000 rpm for 3 minutes, followed by viscosity measurement.

Reference Example 13

0.32 g of xanthan gum was added to 80 g of water adjusted to pH 12.5 by the addition of sodium hydroxide, and the mixture was stirred at 8000 rpm for 3 minutes, followed by viscosity measurement (since xanthan gum alone cannot be concentrated with aluminum chloride hexahydrate, powdery xanthan gum was added to water adjusted to pH 12.5, and the viscosity of this mixture was measured).

Reference Example 14

Water was added to the cellulose fibers 1 to adjust the cellulose fiber concentration to 0.8% by mass. 40 g of 0.8% by mass of xanthan gum was added to 40 g of this cellulose fiber suspension having a cellulose fiber concentration of 0.8% by mass, and the mixture was stirred at 2000 rpm. 0.8 g of aluminum chloride hexahydrate was added to this solution, and the mixture was stirred at 1000 rpm and concentrated to 1.6 g by filtration and compression. This concentrate was crushed in a mixer to prepare a powder. 80 g of a re-dispersing solution (water adjusted to pH 12.5 by the addition of sodium hydroxide) was added to this powder, and the mixture was stirred at 8000 rpm for 3 minutes, followed by viscosity measurement.

Example 12

The same method as in Reference Example 15 was carried out except that 80 g of an aqueous solution containing 1% by mass of sodium chloride, which was adjusted to pH 12.5 by the addition of sodium hydroxide, was used as the re-dispersing solution.

Example 13

The same method as in Reference Example 15 was carried out except that 80 g of an aqueous solution containing 25% by mass of sodium chloride, which was adjusted to pH 12.5 by the addition of sodium hydroxide, was used as the re-dispersing solution.

Example 14

The same method as in Reference Example 15 was carried out except a 80 g of an aqueous solution containing 2% by mass of potassium chloride, which was adjusted to pH 12.5 by the addition of sodium hydroxide, was used as the re-dispersing solution.

Example 15

The same method as in Reference Example 15 was carried out except that 80 g of an aqueous solution containing 0.1% by mass of calcium chloride, which was adjusted to pH 12.5 by the addition of sodium hydroxide, was used as the re-dispersing solution.

Comparative Example 8

The same method as in Reference Example 10 was carried out except that 80 g of an aqueous solution containing 1% by mass of sodium chloride, which was adjusted to pH 12.5 by the addition of sodium hydroxide, was used as the re-dispersing solution.

Comparative Example 9

The same method as in Reference Example 10 was carried out except that 80 g of an aqueous solution containing 25% by mass of sodium chloride, which was adjusted to pH 12.5 by the addition of sodium hydroxide, was used as the re-dispersing solution.

Comparative Example 10

The same method as in Reference Example 10 was carried out except that 80 g of an aqueous solution containing 2% by mass of potassium chloride, which was adjusted to pH 12.5 by the addition of sodium hydroxide, was used as the re-dispersing solution.

Comparative Example 11

The same method as in Reference Example 10 was carried out except that 80 g of an aqueous solution containing 0.1% by mass of calcium chloride, which was adjusted to pH 12.5 by the addition of sodium hydroxide, was used as the re-dispersing solution.

The results are shown in Table 3.

TABLE 3

| No. | Cellulose in concentrate | | Additive in concentrate | | Re-dispersing solution | | Concentration after re-dispersion | | | | Viscosity [mPa·S] |
|---|---|---|---|---|---|---|---|---|---|---|---|
| | Type | Amount | Type | Amount | Salt type | Concentration/amount | CNF [%] | Additive [%] | Salt [%] | Appearance | |
| Reference Example 12 | Production Example 1 | 0.32 g | — | — | — | 80 g | 0.4% | — | — | Uniform dispersion | 3480 |
| Reference Example 13 | — | — | XG | 0.32 g | — | 80 g | — | XG 0.4% | — | Uniform dispersion | 2040 |

TABLE 3-continued

| No. | Cellulose in concentrate Type | Cellulose in concentrate Amount | Additive in concentrate Type | Additive in concentrate Amount | Re-dispersing solution Salt type | Re-dispersing solution Concentration/amount | Concentration after re-dispersion CNF [%] | Concentration after re-dispersion Additive [%] | Concentration after re-dispersion Salt [%] | Appearance | Viscosity [mPa · S] |
|---|---|---|---|---|---|---|---|---|---|---|---|
| Reference Example 14 | Production Example 1 | 0.32 g | XG | 0.32 g | — | 80 g | 0.4% | XG 0.4% | — | Uniform dispersion | 6220 |
| Example 12 | Production Example 1 | 0.32 g | XG | 0.32 g | NaCl | 1% 80 g | 0.4% | XG 0.4% | NaCl 1% | Uniform dispersion | 6840 |
| Example 13 | Production Example 1 | 0.32 g | XG | 0.32 g | NaCl | 25% 80 g | 0.4% | XG 0.4% | NaCl 25% | Uniform dispersion | 8460 |
| Example 14 | Production Example 1 | 0.32 g | XG | 0.32 g | KCl | 2% 80 g | 0.4% | XG 0.4% | KCl 2% | Uniform dispersion | 6530 |
| Example 15 | Production Example 1 | 0.32 g | XG | 0.32 g | $CaCl_2$ | 0.1% 80 g | 0.4% | XG 0.4% | $CaCl_2$ 0.1% | Uniform dispersion | 8180 |
| Comparative Example 8 | Production Example 1 | 0.32 g | — | — | NaCl | 1% 80.8 g | 0.4% | — | NaCl 1% | Precipitates | Immeasurable |
| Comparative Example 9 | Production Example 1 | 0.32 g | — | — | NaCl | 25% 106.7 g | 0.4% | — | NaCl 25% | Precipitates | Immeasurable |
| Comparative Example 10 | Production Example 1 | 0.32 g | — | — | KCl | 2% 81.6 g | 0.4% | — | KCl 2% | Precipitates | Immeasurable |
| Comparative Example 11 | Production Example 1 | 0.32 g | — | — | $CaCl_2$ | 0.1% 80 g | 0.4% | — | $CaCl_2$ 0.1% | Precipitates | Immeasurable |

From Table 3, the following was confirmed.

The concentrate obtained by concentration after mixing of the cellulose fibers with the water-soluble polymer can be uniformly dispersed in salt water (Examples 12 to 15).

The concentrate obtained by the concentration of the cellulose fibers alone without being mixed with the water-soluble polymer is not dispersed in salt water, resulting in precipitates (Comparative Examples 8 to 11).

<Addition of Salt Water to Low-Concentration Cellulose Fiber Suspension>

The cellulose fibers used were the cellulose fibers 1 produced in Production Example 1 unless otherwise specified.

Reference Example 15

The viscosity of 100 g of a cellulose fiber suspension having a cellulose fiber concentration of 0.4% by mass was measured.

Reference Example 16

The viscosity of 100 g of an aqueous solution containing 0.4% by mass of xanthan gum was measured.

Reference Example 17

The viscosity of 100 g of an aqueous solution containing 0.4% by mass of carboxymethylcellulose was measured.

Reference Example 18

The viscosity of 100 g of by mass of a polycarboxylic acid-type anionic surfactant was measured.

Reference Example 19

50 g of an aqueous solution containing 0.8% by mass of xanthan gum was added to 50 g of a cellulose fiber suspension having a cellulose fiber concentration of 0.8% by mass, and the mixture was stirred at 2000 rpm for 1.5 minutes, followed by viscosity measurement.

Reference Example 20

The same method as in Reference Example 19 was carried out except that carboxymethylcellulose was used instead of xanthan gum.

Reference Example 21

The same method as in Reference Example 19 was carried out except that 2.4% by mass of a polycarboxylic acid-type anionic surfactant was used instead of the aqueous solution containing 0.8% by mass of xanthan gum.

Example 16

50 g of an aqueous solution containing 1.0% by mass of xanthan gum was added to 50 g of a cellulose fiber suspension having a cellulose fiber concentration of 1.0% by mass, and the mixture was stirred at 2000 rpm for 1.5 minutes. 25 g of an aqueous solution containing 5% by mass of sodium chloride was added to this slurry, and the mixture was stirred at 2000 rpm for 1.5 minutes, followed by viscosity measurement.

Example 17

The same method as in Example 16 was carried out except that 25 g of an aqueous solution containing 0.5% by mass of calcium chloride was added as the salt.

Example 18

The same method as in Example 16 was carried out except that 25 g of 7.5% by mass of artificial seawater was added as the salt.

Example 19

The same method as in Example 16 was carried out except that carboxymethylcellulose was used instead of xanthan gum.

Example 20

The same method as in Example 19 was carried out except that 25 g of an aqueous solution containing 0.5% by mass of calcium chloride was added as the salt.

Example 21

The same method as in Example 19 was carried out except that 25 g of 17.5% by mass of artificial seawater was added as the salt.

Example 22

The same method as in Example 14 was carried out except that 3.0% by mass of a polycarboxylic acid-type anionic surfactant was used instead of 1.0% by mass of xanthan gum.

Example 23

The same method as in Example 22 was carried out except that 25 g of an aqueous solution containing 0.5% by mass of calcium chloride was added as the salt.

Example 24

The same method as in Example 22 was carried out except that 25 g of 17.5% by mass of artificial seawater was added as the salt.

Comparative Example 12

25 g of an aqueous solution containing 5% by mass of sodium chloride was added as the salt to 100 g of a cellulose fiber suspension having a cellulose fiber concentration of 0.5% by mass, and the mixture was stirred at 2000 rpm for 1.5 minutes.

Comparative Example 13

The same method as in Comparative Example 12 was carried out except that 25 g of an aqueous solution containing 0.5% by mass of calcium chloride was added as the salt.

Comparative Example 14

The same method as in Comparative Example 12 was carried out except that 25 g of 17.5% by mass of artificial seawater was added as the salt.

Comparative Example 15

A mixed liquid of 25 g of an aqueous solution containing 5% by mass of sodium chloride and 50 g of an aqueous solution containing 1.0% by mass of xanthan gum was added to 50 g of a cellulose fiber suspension having a cellulose fiber concentration of 1.0% by mass, and the mixture was stirred at 2000 rpm for 1.5 minutes, followed by viscosity measurement.

The results are shown in Table 4.

TABLE 4

| No. | Cellulose suspension Type | Cellulose suspension Concentration/amount | Additive Type | Additive Concentration/amount | Added salt Salt Type | Added salt Concentration/amount | Concentration after mixing CNF [%] | Concentration after mixing Additive [%] | Concentration after mixing Salt [%] | Appearance | Viscosity [mPa·S] |
|---|---|---|---|---|---|---|---|---|---|---|---|
| Reference Example 15 | Production Example 1 | 0.4% 100 g | — | — | — | — | 0.4% | — | — | Uniform dispersion | 2970 |
| Reference Example 16 | — | — | XG | 0.4% 100 g | — | — | — | XG 0.4% | — | Uniform dispersion | 1970 |
| Reference Example 17 | — | — | CMC | 0.4% 100 g | — | — | — | CMC 0.4% | — | Uniform dispersion | 220 |
| Reference Example 18 | — | — | PC | 1.2% 100 g | — | — | — | PC 1.2% | — | Uniform dispersion | 44 |
| Reference Example 19 | Production Example 1 | 0.8% 50 g | XG | 0.8% 50 g | — | — | 0.4% | XG 0.4% | — | Uniform dispersion | 8450 |
| Reference Example 20 | Production Example 1 | 0.8% 50 g | CMC | 0.8% 50 g | — | — | 0.4% | CMC 0.4% | — | Uniform dispersion | 4160 |
| Reference Example 21 | Production Example 1 | 0.8% 50 g | PC | 2.4% 50 g | — | — | 0.4% | PC 1.2% | — | Uniform dispersion | 2890 |
| Example 16 | Production Example 1 | 1.0% 50 g | XG | 1.0% 50 g | NaCl | 5% 25 g | 0.4% | XG 0.4% | NaCl 1% | Uniform dispersion | 7950 |
| Example 17 | Production Example 1 | 1.0% 50 g | XG | 1.0% 50 g | $CaCl_2$ | 0.5% 25 g | 0.4% | XG 0.4% | $CaCl_2$ 0.01% | Uniform dispersion | 9010 |
| Example 18 | Production Example 1 | 1.0% 50 g | XG | 1.0% 50 g | Artifical seawater | 17.5% 25 g | 0.4% | XG 0.4% | Seawater 3.5% | Uniform dispersion | 8140 |
| Example 19 | Production Example 1 | 1.0% 50 g | CMC | 1.0% 50 g | NaCl | 5% 25 g | 0.4% | CMC 0.4% | NaCl 1% | Uniform dispersion | 3810 |
| Example 20 | Production Example 1 | 1.0% 50 g | CMC | 1.0% 50 g | $CaCl_2$ | 1.0% 0 g | 0.4% | CMC 0.4% | $CaCl_2$ 0.1% | Uniform dispersion | 3130 |
| Example 21 | Production Example 1 | 1.0% 50 g | CMC | 1.0% 50 g | Artifical seawater | 17.5% 25 g | 0.4% | CMC 0.4% | Seawater 3.5% | Uniform dispersion | 3050 |
| Example 22 | Production Example 1 | 1.0% 50 g | PC | 3.0% 50 g | NaCl | 5% 25 g | 0.4% | PC 1.2% | NaCl 1% | Uniform dispersion | 2740 |
| Example 23 | Production Example 1 | 1.0% 50 g | PC | 3.0% 50 g | $CaCl_2$ | 0.1% 25 g | 0.4% | PC 1.2% | $CaCl_2$ 0.1% | Uniform dispersion | 2610 |
| Example 24 | Production Example 1 | 1.0% 50 g | PC | 3.0% 50 g | Artifical seawater | 17.5% 25 g | 0.4% | PC 1.2% | Seawater 3.5% | Uniform dispersion | 2580 |
| Comparative Example 12 | Production Example 1 | 0.5% 50 g | — | — | NaCl | 5% 25 g | 0.4% | — | NaCl 1% | Gelation | Immeasurable |

TABLE 4-continued

| | Cellulose suspension | | Additive | | Added salt | | Concentration after mixing | | | | Viscosity |
|---|---|---|---|---|---|---|---|---|---|---|---|
| No. | Type | Concentration/ amount | Type | Concentration/ amount | Salt Type | Concentration/ amount | CNF [%] | Additive [%] | Salt [%] | Appearance | [mPa · S] |
| Comparative Example 13 | Production Example 1 | 0.5% 50 g | — | — | CaCl$_2$ | 0.1% 25 g | 0.4% | — | CaCl$_2$ 0.1% | Gelation | Immeasurable |
| Comparative Example 14 | Production Example 1 | 0.5% 50 g | — | — | Artifical seawater | 17.5% 25 g | 0.4% | — | Seawater 3.5% | Gelation | Immeasurable |
| Comparative Example 15 | Production Example 1 | 1.0% 50 g | XG | 1.0% 50 g | NaCl | 5% 5 g | 0.4% | XG 0.4% | NaCl 1% | Gelation | Immeasurable |

Comparative Example 15: Mixed liquid of salt water and the additive was added to the ultrafine cellulose suspension.

From Table 4, the following was confirmed.

When the low-concentration cellulose fiber suspension and a solution of the water-soluble polymer are mixed in advance, the cellulose fibers can be uniformly dispersed even if salt water is added (Examples 16 to 24).

The addition of salt water to the low-concentration cellulose suspension unmixed with the water-soluble polymer also causes gelation so that the cellulose fibers are not uniformly dispersed (Comparative Examples 12 to 14).

The addition of salt water containing the water-soluble polymer to the low-concentration suspension of the cellulose fibers alone causes gelation so that the cellulose fibers are not uniformly dispersed (Comparative Example 15). It is preferred to mix the low-concentration cellulose fiber suspension with the water-soluble polymer before addition of salt water.

<Water Stopping Property Test>

The cellulose fibers used were the cellulose fibers 1 produced in Production Example 1 unless otherwise specified.

Reference Example 22

A concentrate of the ultrafine cellulose fibers was dispersed in water by the method of Reference Example 1 to prepare 160 g of a dispersion. 160 g of a 10% aqueous bentonite solution (Kunigel V1, Kunimine Industries Co., Ltd.) was added thereto, and the mixture was stirred at 3000 rpm for 60 minutes and then left standing for 24 hours to prepare sufficiently hydrated mud water. The amount of water filtered was measured when a pressure of 3 kg/cm2 G was applied to 200 g of the mud water at room temperature for 30 minutes using a filtration tester based on the API specification at 25° C. Specifically, a smaller amount of water filtered means more favorable water stopping performance.

Example 25

The same method as in Reference Example 22 was carried out except that the dispersion obtained in Example 1 was used.

Example 26

The same method as in Reference Example 22 was carried out except that the dispersion obtained in Example 5 was used.

Comparative Example 16

The same method as in Reference Example 22 was carried out except that the dispersion (ultrafine cellulose fibers were precipitated) obtained in Comparative Example 1 was used.

Comparative Example 17

The same method as in Reference Example 22 was carried out except that the dispersion (ultrafine cellulose fibers were non-uniformly dispersed with their grains remaining) obtained in Comparative Example 7 was used.

The results are shown in Table 5.

TABLE 5

| | Production method before addition of aqueous bentonite solution | | | | | | | | | Amount of water filtered [mL] |
|---|---|---|---|---|---|---|---|---|---|---|
| | Cellulose in | | Additive in | | Re-dispersing solution | | Concentration after re-dispersion | | | |
| No. | Type | Amount | Type | Amount | Type | Amount | Type | Amount | Type | |
| Reference Example 22 | Production Example 1 | 0.32 g | — | — | — | 80g | 0.4% | — | — | 8.5 |
| Example 25 | Production Example 1 | 0.32 g | XG | 0.32 g | NaCl | 1% 80 g | 0.4% | XG 0.4% | NaCl 1% | 6.7 |
| Example 26 | Production Example 1 | 0.32 g | XG | 0.32 g | KCl | 2% 80 g | 0.4% | XG 0.4% | KCl 2% | 6.4 |
| Comparative Example 16 | Production Example 1 | 0.32 g | — | — | NaCl | 1% 80 g | 0.4% | — | NaCl 1% | 18.4 |
| Comparative Example 17 | Production Example 1 | 0.32 g | — | — | NaCl XG | 1% 80 g 0.4% | 0.4% | XG 0.4% | NaCl 1% | 15.1 |

From Table 5, the following was confirmed.

The solution obtained by the concentration of the cellulose fibers and the water-soluble polymer and stable dispersion in salt water has a high water stopping effect (Examples 25 and 26).

The solution obtained by the dispersion of the concentrate of the cellulose fibers alone unmixed with the water-soluble polymer in salt water where the cellulose fibers have been precipitated has a low water stopping effect (Comparative Example 16).

The solution obtained by the dispersion of the concentrate of the cellulose fibers alone in water-soluble polymer-containing salt water where the cellulose fiber concentrate has been non-uniformly dispersed with the grains remaining has a low water stopping effect (Comparative Example 17).

The invention claimed is:

1. A method for producing a salt water thickener, which comprises mixing a suspension of ultrafine cellulose fibers having type I crystal structure and a solution of a water-soluble polymer, and then concentrating the thus obtained mixture so that a solid content concentration of the ultrafine cellulose fibers becomes 20% by mass or larger,
    wherein the ultrafine cellulose fibers comprise 0.1 to 3.0 mmol/g of a substituent, wherein the substituent is a sulfonic acid-derived group, a phosphoric acid-derived group or a group obtained by 2,2,6,6-tetramethylpiperidine-1-oxyl oxidation,
    wherein an amount of the water-soluble polymer contained with respect to 1 part by mass of the ultrafine cellulose fibers is 0.05 to 50 parts by mass,
    and wherein the sulfonic acid-derived group or the phosphoric acid-derived group is introduced into the ultrafine cellulose fibers by an esterification reaction.

* * * * *